(12) United States Patent
Binal et al.

(10) Patent No.: US 12,360,729 B2
(45) Date of Patent: Jul. 15, 2025

(54) SYSTEM AND METHOD FOR TRACKING AND COMPENSATING FOR DYNAMIC DELAY BETWEEN ENDPOINTS IN AN AUDIO/VIDEO COMMUNICATION SYSTEM

(71) Applicant: Crestron Electronics, Inc., Rockleigh, NJ (US)

(72) Inventors: Ekin Binal, Rockleigh, NJ (US); Jason Oster, Rockleigh, NJ (US); Doug Jacobson, Rockleigh, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 325 days.

(21) Appl. No.: 17/686,650

(22) Filed: Mar. 4, 2022

(65) Prior Publication Data

US 2022/0283775 A1 Sep. 8, 2022

Related U.S. Application Data

(60) Provisional application No. 63/157,559, filed on Mar. 5, 2021.

(51) Int. Cl.
G06F 3/16 (2006.01)
H04S 1/00 (2006.01)

(52) U.S. Cl.
CPC ............. *G06F 3/165* (2013.01); *H04S 1/007* (2013.01)

(58) Field of Classification Search
None
See application file for complete search history.

(56) References Cited

U.S. PATENT DOCUMENTS

| | | | |
|---|---|---|---|
| 2008/0131076 A1* | 6/2008 | Hashimoto | H04N 5/76 386/203 |
| 2012/0327300 A1* | 12/2012 | Hutchings | H04N 21/42607 348/E5.009 |
| 2017/0019870 A1* | 1/2017 | Srivastava | H04W 56/001 |
| 2020/0278831 A1 | 9/2020 | Nielsen et al. | |

* cited by examiner

Primary Examiner — Hemant S Patel
(74) Attorney, Agent, or Firm — Mark W. Hrozenchik

(57) ABSTRACT

A system and method are provided herein for dynamically adjusting delay in an audio distribution system, the method comprising: determining what audio processing devices comprise each of a plurality of audio data channels, wherein each of the plurality of audio data channels comprises a path from a digital audio receiving device to a back end audio playing device; obtaining digital audio processing delays for each of the audio processing devices for each of the audio data channels; determining which of the audio data channels has the greatest delay in processing and transmitting digital audio data signals (digital audio data processing delay) prior to broadcasting the digital audio data signals as acoustic audio signals; determining a difference between the audio data channel with the greatest digital audio data processing delay and each of the remaining audio data channels (delay difference per channel); and adding a delay to each digital audio word in each different audio channel that substantially equalizes the digital audio data processing delay between each of the different audio data channels.

12 Claims, 15 Drawing Sheets

| Audio Distribution Channel # | 1 | 2 | 3 | 4 | 5 |
|---|---|---|---|---|---|
| Channel Delay (ms) $\delta_{CH\#}$ | 10 | 8 | 17 | 32 | 4 |
| Delay to add to Each Respective ADC to Equalize Delays (ms) ($Delay_{CH\#} = \delta_{CH\#Max} - \delta_{CH\#}$) | 22 | 24 | 15 | 0 | 28 |

$\Delta_{Diff} = Delay_{CH\#MAX} - Delay_{CH\#MIN}$ $\Delta_{Diff} = 28 - 15 = 13$ ms If the Threshold were 10 ms, then delays would be added;
If the Threshold were 15 ms, no delays would be added.
Note that the delay from $ADC_4$ is ignored, as the delays are in reference to that ADC's transit time (or delay).

FIG. 9

SYSTEM AND METHOD FOR TRACKING AND COMPENSATING FOR DYNAMIC DELAY BETWEEN ENDPOINTS IN AN AUDIO/VIDEO COMMUNICATION SYSTEM

PRIORITY INFORMATION

The present application claims priority under 35 U.S.C. § 119(e) to U.S. Provisional Patent Application Ser. No. 63/157,559, filed Mar. 5, 2021, the entire contents of which are expressly incorporated herein by reference.

BACKGROUND OF THE INVENTION

Technical Field

The embodiments described herein relate generally to audio/video (AV) communication systems, and more specifically to systems, methods, and modes for tracking and compensating for multiple types of dynamic delay between endpoints in an AV communications system.

Background Art

As the number of different media platforms for AV communication systems, particular in teleconferencing systems, has increased, the ability to synchronize arrival time of both audio and video has become difficult to accomplish.

Existing solutions generally only address the ability to synchronize for lip synchronization issues. There are a number of conventional existing synchronization solutions for transports, but none of these address inherent delays in a system. For example, AV receivers typically process standard audio travel through a system at different rates than surround sound. Surround sound audio is inherently different than standard audio, such as voice. There are no presently available systems that compensate for these different types of audio at a system level.

Accordingly, a need has arisen for systems, methods, and modes for tracking and compensating for multiple types of dynamic delay between endpoints in an AV communications system.

SUMMARY

It is an object of the embodiments to substantially solve at least the problems and/or disadvantages discussed above, and to provide at least one or more of the advantages described below.

It is therefore a general aspect of the embodiments to provide systems, methods, and modes for tracking and compensating for multiple types of dynamic delay between endpoints in an AV communications system that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

According to a first aspect of the embodiments, a method for dynamically adjusting delay in an audio distribution system is provided, comprising: determining what audio processing devices comprise each of a plurality of audio data channels, wherein each of the plurality of audio data channels comprises a path from a digital audio receiving device to a back end audio playing device; obtaining digital audio processing delays for each of the audio processing devices for each of the audio data channels; determining which of the audio data channels has the greatest delay in processing and transmitting digital audio data signals (digital audio data processing delay) prior to broadcasting the digital audio data signals as acoustic audio signals; determining a difference between the audio data channel with the greatest digital audio data processing delay and each of the remaining audio data channels (delay difference per channel); and adding a delay to each digital audio word in each different audio channel that substantially equalizes the digital audio data processing delay between each of the different audio data channels.

According to the first aspect of the embodiments, the method further comprises comparing each of the delay differences per channel to a first predetermined threshold, and if any of the delay differences are the same or greater than the first predetermined threshold then performing the adding a delay step, and if none of the delay differences per channel exceed the first predetermined threshold, the not adding any delays to any of the digital words in any of the audio channels.

According to the first aspect of the embodiments, the first predetermined threshold comprises an amount of time that if met or exceeded creates audible audio synchronization issues.

According to the first aspect of the embodiments, the method further comprises: returning to the step of determining which of the audio data channels has the greatest delay in processing and transmitting digital audio data signals, and repeating additional steps if none of the delay differences per channel exceed the first predetermined threshold.

According to the first aspect of the embodiments, the method further comprises: transmitting each digital audio word with the added delay to the different audio data channels; receiving each of the digital audio words with the added delay at respective back end device; extracting the added delay from each of the received digital audio words; transmitting the added delay to a respective delay device; delaying the received digital audio words by an amount substantially equal to the added delay by the respective delay devices; and broadcasting the delayed digital audio words by respective loudspeakers at each back end device as acoustic audio signals such that each acoustic audio signal is broadcast substantially simultaneously.

According to the first aspect of the embodiments, the step of determining which of the audio data channels has the greatest delay in processing and transmitting digital audio data signals further comprises: recording a configuration of each of the audio processing devices and revising a delay associated with each of the audio processing devices and for the associated audio data channel if the configuration changes.

According to a second aspect of the embodiments, an audio distribution system is provided, comprising: a plurality of audio processing devices, the audio processing devices comprising at least one digital audio receiving device and a plurality of back end audio playing devices, the plurality of audio processing devices organized into audio data channels; a plurality of loudspeakers, at least one for each audio data channel; a plurality of digital audio delay devices, at least one for each audio data channel; at least one processor in each of the digital audio receiving device and each of the back end audio playing devices; a memory device operatively connected with each of the processors, wherein each of the memory devices stores computer-executable instructions that, when executed by each of the processors, causes each of the processors to execute a method that comprises: determining what audio processing devices comprise each of a plurality of audio data channels; obtaining digital audio processing delays for each of the audio processing devices for each of the audio data channels; determining which of the audio data channels has the greatest delay in processing and transmitting digital audio data signals (digital audio data processing delay) prior to broadcasting the digital audio data signals as acoustic audio signals; determining a difference between the audio data channel with the greatest digital audio data processing delay and each of the remaining audio data channels (delay difference per channel); and adding a delay to each digital audio word in each different audio channel that substantially equalizes the digital audio data processing delay between each of the different audio data channels.

According to the second aspect of the embodiments, the method wherein the method that is executed by the processors further comprises: comparing each of the delay differences per channel to a first predetermined threshold, and if any of the delay differences are the same or greater than the first predetermined threshold then performing the adding a delay step, and if none of the delay differences per channel exceed the first predetermined threshold, then not adding any delays to any of the digital words in any of the audio channels.

According to the second aspect of the embodiments, the first predetermined threshold comprises an amount of time that if met or exceeded creates audible audio synchronization issues.

According to the second aspect of the embodiments, wherein the method that is executed by the processors further comprises: returning to the step of determining which of the audio data channels has the greatest delay in processing and transmitting digital audio data signals, and repeating additional steps if none of the delay differences per channel exceed the first predetermined threshold.

According to the second aspect of the embodiments, wherein the method that is executed by the processors further comprises: transmitting each digital audio word with the added delay to the different audio data channels; receiving each of the digital audio words with the added delay at respective back end device; extracting the added delay from each of the received digital audio words; transmitting the added delay to a respective delay device; delaying the received digital audio words by an amount substantially equal to the added delay by the respective delay devices; and broadcasting the delayed digital audio words by respective loudspeakers at each back end device as acoustic audio signals such that each acoustic audio signal is broadcast substantially simultaneously.

According to the second aspect of the embodiments, wherein the step of determining which of the audio data channels has the greatest delay in processing and transmitting digital audio data signals further comprises: recording a configuration of each of the audio processing devices and revising a delay associated with each of the audio processing devices and for the associated audio data channel if the configuration changes.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

FIG. 9 illustrates a table that shows the results of delay determinations for each of a plurality of audio distribution channels according to aspects of the embodiments.

DETAILED DESCRIPTION

Figure 1:
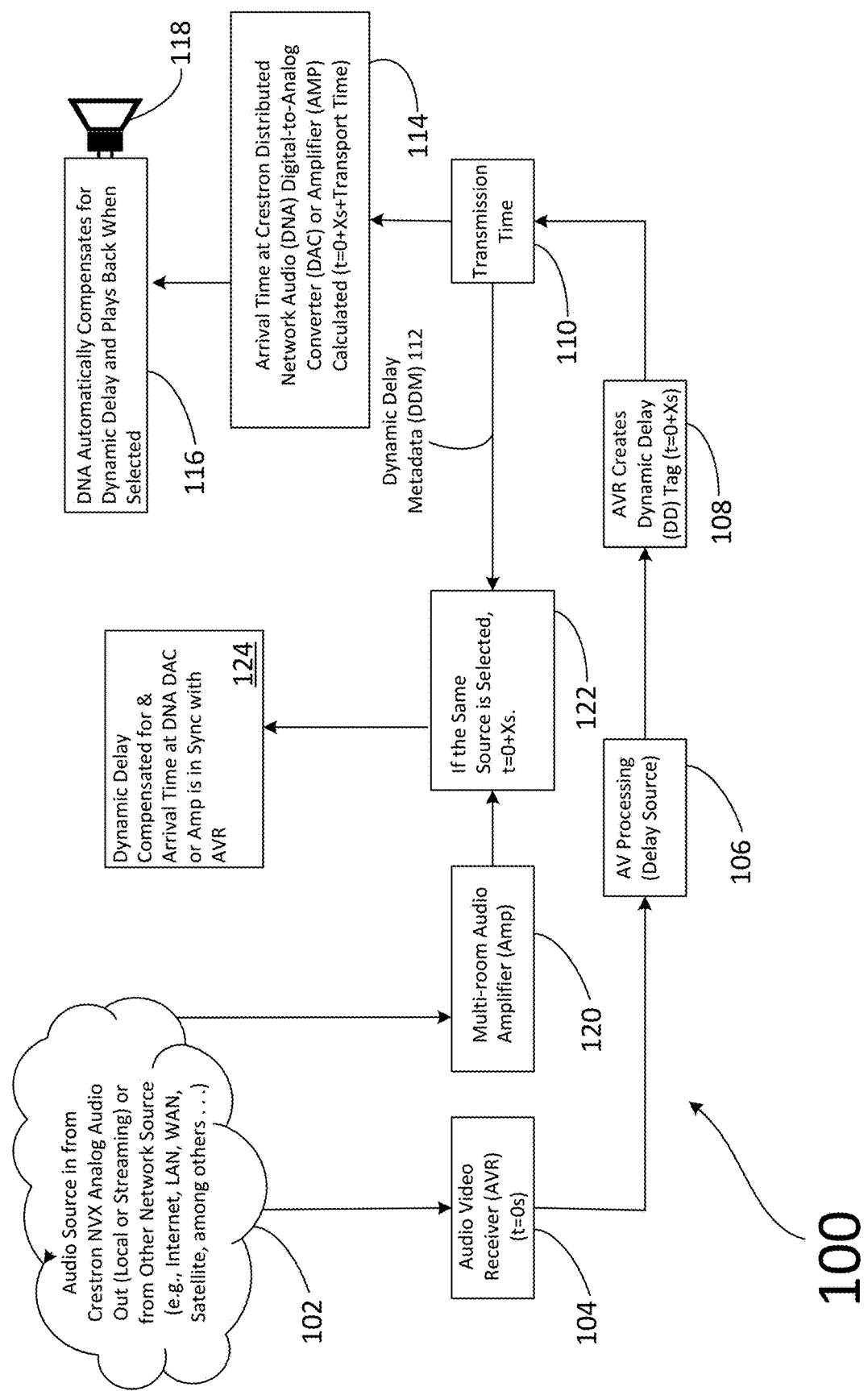
FIG. 1 illustrates a diagram illustrating both flow steps and components of a network within which aspects of the embodiments can be implemented.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices, such as audio systems, and more particularly to audio-video receivers and surround sound stereo systems, among other types.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

The different aspects of the embodiments described herein pertain to the context of a systems, methods, and modes for tracking and compensating for multiple types of dynamic delay between endpoints in an AV communications system but is not limited thereto, except as may be set forth expressly in the appended claims.

For 40 years Creston Electronics Inc., has been the world's leading manufacturer of advanced control and automation systems, innovating technology to simplify and enhance modern lifestyles and businesses. Crestron designs, manufactures, and offers for sale integrated solutions to control audio, video, computer, safety, and environmental systems. In addition, the devices and systems offered by Crestron streamlines technology, improving the quality of life in commercial buildings, universities, hotels, hospitals, and homes, among other locations. Accordingly, the systems, methods, and modes for tracking and compensating for multiple types of dynamic delay between endpoints in an AV communications system can be used to compensate for dynamic delays created by multiple types of audio sources, and generates one or more dynamic delay metadata sets based on audio source to be used in audio/video distribution systems that can be manufactured by Crestron Electronics Inc., located in Rockleigh, NJ, and has been marketed and sold under the registered trademark name of "Crestron DM NVX® and/or Crestron DM NAX®".

LIST OF PART NUMBERS USED IN THE SPECIFICATION IN NUMERICAL ORDER

102 Audio Source in from Crestron NVX Analog Audio Out (Local or Streaming) or from Other Network Source (e.g., Internet, LAN, WAN, Satellite, among others . . . ))
104 Audio Video Receiver (AVR) (t=0 s)
106 AV Processing (Delay Source)
108 AVR Creates Dynamic Delay (DD) Tag (t=0+Xs)
110 Transmission Time
112 Dynamic Delay Metadata (DDM)
114 Arrival Time at Crestron Distributed Network Audio (DNA) Digital-to-Analog Converter (DAC) or Amplifier (AMP) Calculated (t=0+Xs+Transport Time)
116 DNA Automatically Compensates for Dynamic Delay and Plays Back When Selected
118 Loudspeaker
120 Multiroom Audio Amplifier (Amp)
122 If the Same Source is Selected, t=0+Xs.
124 Dynamic Delay Compensated for & Arrival Time at DNA DAC or Amp is in Sync with AVR
202 Additional Audio Components
204 Video Display
206 Soundbar
300 Multi Room Audio/Video System that Compensates for Dynamic Delay (AV Distribution System)
302 Digital Audio/Video Transceiver (DAV Transceiver with/without Delay (with: 302'; without 302")
304 Dynamic Delay Adjustment Application (DDA App)
306 A/V Room with Display and 5.1 Surround Sound Audio Loudspeakers
308 Room with Audio Only
310 Combined Digital A/V Transceiver Device (Video Processor, Digital Signal Processor (DSP), Amplifier(s) and Delay/No-Delay Version)
312 Combined Digital Audio Transceiver (Back End Device (BED)) (Digital Signal Processor (DSP), Amplifier(s), with/without Delay (with: 312'; without: 312"))
314 Network
316 Video Display
318 Loudspeakers
402 A/V Transceiver
404 A/V Splitter
406 Video Processor
408 Digital Signal Processor (DSP)
410 Processor
412 Memory
414 Audio Transceivers
502 Audio Delay
504 Analog-to-Digital Converter (ADC)
506 Digitally Controllable Amplifier (Amp)
800 Audio Data Word
802 Audio Data Bits
804 DDA Metadata Bits
900 Table of Audio Data Channel Delay Determinations
902 First row of Table 900
904 Second row of Table 900
906 Third row of Table 900
1000 Method for Dynamically Adjusting Delay in an Audio System such that Audio From Two or More Locations is Broadcast Substantially Simultaneously, Wherein Predetermined Delays Are Used in Estimating Delays in Each Audio Distribution Channel
1002-1018 Method Steps of Method 1000
1100 Method for Dynamically Adjusting Delay in an Audio System such that Audio From Two or More Locations is Broadcast Substantially Simultaneously, Wherein Test Signals are Generated Periodically for Estimating Delays in Each Audio Distribution Channel
1102-1124 Method Steps of Method 1000
1202 Processor(s)
1204 Processor Internal Memory

Figure 2:
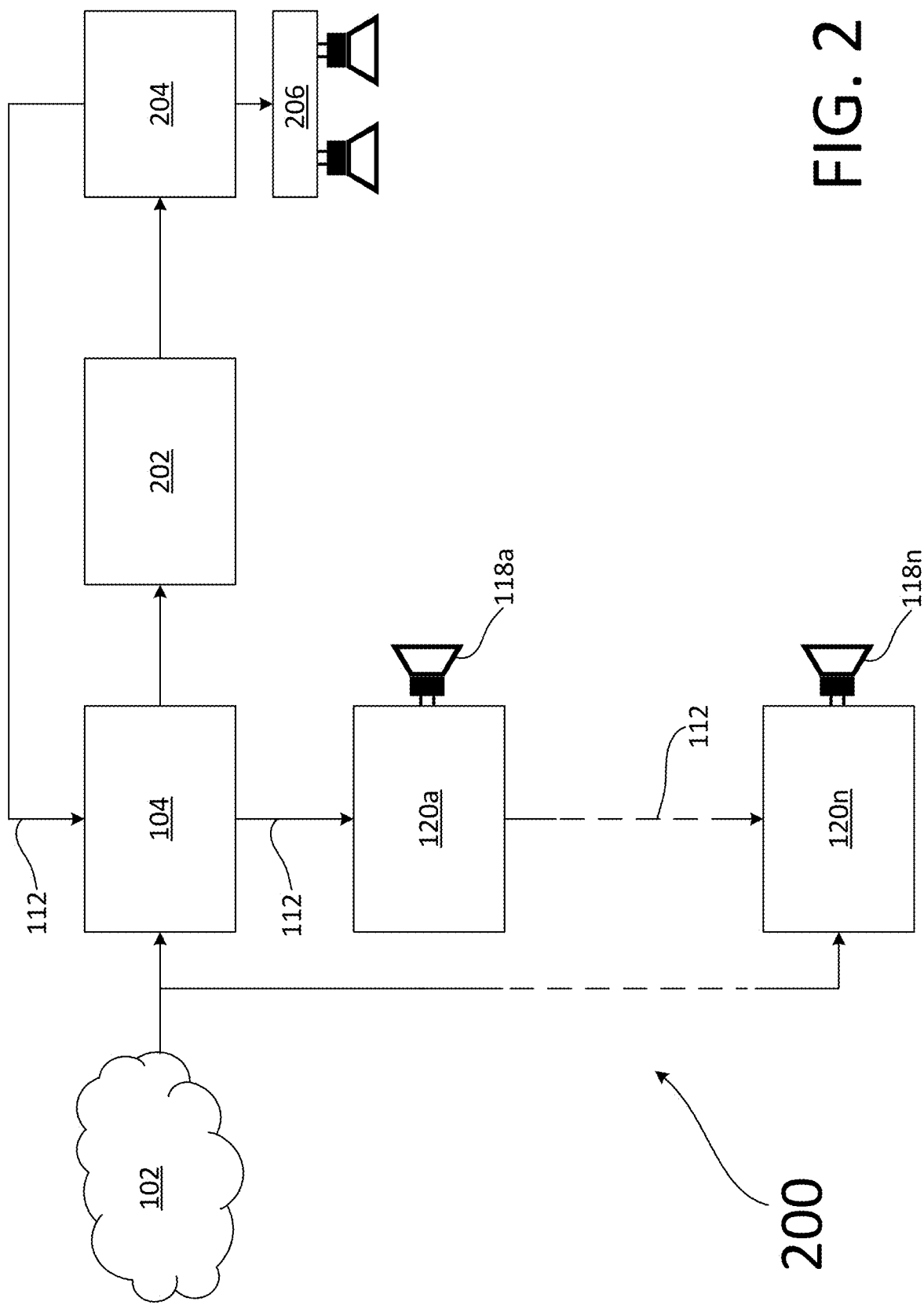
FIG. 2 illustrates a block diagram of a network within which aspects of the embodiments can be implemented.

1206 Computer Operating System (Operating System (OS))
1208 Internal Data/Command Bus (Bus)
1210 Network (Could be a LAN/WAN/GAN (e.g., Internet))
1212 Read-Only Memory (ROM)
1214 Random Access Memory (RAM)
1216 Printed Circuit Board (PCB)
1218 Hard Disk Drive (HDD)
1220 Universal Serial Bus (USB) Port
1222 Ethernet Port
1224 Video Graphics Array (VGA) Port or High Definition Multimedia Interface (HDMI)
1226 Compact Disk (CD)/Digital Video Disk (DVD) Read/Write (RW) (CD/DVD/RW) Drive
1228 Floppy Diskette Drive
1230 Integrated Display/Touch-Screen (Laptop/Tablet etc.)
1232 Wi-Fi Transceiver
1234 BlueTooth (BT) Transceiver
1236 Near Field Communications (NFC) Transceiver
1238 Third Generation (3G), Fourth Generation (4G), Fifth Generation (5G), Long Term Evolution (LTE) (3G/4G/5G/LTE) Transceiver
1240 Communications Satellite/Global Positioning System (Satellite) Transceiver
1242 Mouse
1244 Scanner/Printer/Fax Machine
1246 Universal Serial Bus (USB) Cable
1248 High Definition Multi-Media Interface (HDMI) Cable
1250 Ethernet Cable (CAT5)
1252 External Memory Storage Device
1254 Flash Drive Memory
1256 CD/DVD Diskettes
1258 Floppy Diskettes
1260 Keyboard
1262 External Display/Touch-Screen
1264 Antenna
1266 Shell/Box
1290 Computer
1302 Modulator/Demodulator (Modem)
1304 Wireless Router
1306 Internet Service Provider (ISP)
1308 Server/Switch/Router
1310 Internet
1312 Cellular Service Provider
1314 Cellular Telecommunications Service Tower (Cell Tower)
1316 Satellite Control Station
1318 GPS Station
1320 Satellite (Communications/Global Positioning System (GPS))
1322 Mobile Electronic Device (MED)/Personal Electronic Device (PED)
1324 Plain Old Telephone Service (POTS) Provider List of Acronyms Used in the Specification in Alphabetical Order 3G Third Generation
4G Fourth Generation
5G Fifth Generation
6G Sixth Generation
ADC Analog-to-Digital Converter
Amp Amplifier
API Application Programming Interface
App Executable Software Programming Code/Application
API Application Programming Interface
ASIC Application Specific Integrated Circuit
AV Audio Video
AVR Audio Video Receiver
BED Back End Device
BIOS Basic Input/Output System
BT BlueTooth
CD Compact Disk
CRT Cathode Ray Tube
DAC Digital-to-Audio Converter
DD Dynamic Delay
DDA Dynamic Delay Adjustment
DDM Dynamic Delay Metadata
DNA Distributed Network Audio
DSP Digital Signal Processor
DVD Digital Video Disk
EEPROM Electrically Erasable Programmable Read Only Memory
FPGA Field Programmable Gate Array
GAN Global Area Network
GPS Global Positioning System
GUI Graphical User Interface
GV Gravity Vector
HDD Hard Disk Drive
HDMI High Definition Multimedia Interface
ISP Internet Service Provider
LCD Liquid Crystal Display
LED Light Emitting Diode Display
LTE Long Term Evolution
MODEM Modulator-Demodulator
NFC Near Field Communications
PC Personal Computer
PDF Portable Document Form
PED Personal Electronic Device
POTS Plain Old Telephone Service
PROM Programmable Read Only Memory
RAM Random Access Memory
ROM Read-Only Memory
RW Read/Write
USB Universal Serial Bus (USB) Port
UV Ultraviolet Light
UVPROM Ultraviolet Light Erasable Programmable Read Only Memory
VGA Video Graphics Array FIG. 1 illustrates a diagram illustrating both flow steps and components of dynamic delay adjustment network (DDANW) 100 within which aspects of the embodiments can be implemented, and FIG. 2 illustrates a block diagram of dynamic delay adjustment network (DDANW) 100 within which aspects of the embodiments can be implemented.

In FIG. 1, audio can be transmitted through network 102 to either or both of audio video receiver (AVR) 104 or multi-room amplifier (Amp) 120. AV processing occurs in AVR 104 as shown in block 106, and which can be referred to as the delay source. In block 108, AVR 104 creates a dynamic delay tag t=0+Xs, wherein Xs equals the processing delay. In block 110 a certain amount of transmission time occurs, and this is also reported in the dynamic delay tag. Such dynamic delay tag, which can also be referred to as dynamic delay metadata 112, is shared with other components of DDANW 100 according to aspects of the embodiments. This is shown in block 122, which illustrates the processing step of adding delay when the same audio is received by Amp 120. In block 124, the dynamic delay has been added to the audio signal and the audio signal is transmitted at substantially the same time as by loudspeaker 118 which illustrates the output from AVR 104, which has included such transport and processing delay times as shown by blocks 110, 114, and 116 according to aspects of the embodiments. FIG. 2 is substantially similar to FIG. 1, but the processing elements have not been included, and additional components block 202 is shown in FIG. 2 between AVR 104 and video display 204 and soundbar 206 (which is similar to loudspeaker(s) 118 of FIG. 1).

Aspects of the embodiments are directed to tracking delay throughout an audio/video teleconferencing system in order to provide an ability to compensate for inter-media and inter-room delays of different types of audio sounds.

Aspects of the embodiments include an audio/video teleconferencing system that is interconnected through a network, traditionally through Ethernet, in combination referred to as dynamic delay adjustment network (DDANW) 100. DDANW 100 can include multiple components with sources and destinations (e.g., transmitters and receivers), carrying/transmitting/receiving audio and/or video and audio content. Aspects of the embodiments define a protocol that establishes a dynamic delay definition that is constantly updated as the delays change. Different types of sources, and even different implementations of the same type of source (e.g., each of three amplifiers, same model, manufacturer) includes an inherent unique delay, and this delay can change based on the processing that happens through DDANW 100.

For example, an audio input signal that travels from any given input of an audio/video receiver (AVR) to the output will have a built-in delay, and this delay can change based on the processing that occurs within the AVR ($AVR_1$). That same audio source fed to the same or different AVR ($AVR_N$), and/or other components (including, e.g., a standard audio amplifier without processing), can incur a different delay and can playback earlier or later than the audio that was processed through $AVR_1$. Aspects of the embodiments include processing and components that generate source-based dynamic delay metadata that can compensate for all of the delays, including the delay in a standard audio amplifier's (AMP) output so that all of the audio outputs playback at exactly the same time.

Aspects of the embodiments provide a system and method that defines source-based dynamic delay metadata and updates it dynamically as it passes through the system. Furthermore, aspects of the embodiments provide a manner for the source-based dynamic delay metadata to be shared within the network of the system so that downstream receivers may time align in scenarios where synchronized output is desired.

According to aspects of the embodiments, dynamic delay metadata can be created by one of more of the devices of DDANW 100. These devices can determine dynamic audio delays and transmit such information to other devices of DDANW 100 such that audio is received at one or more loudspeakers at substantially the same time, and can be aligned with video if it is present as well. Such dynamic audio delay metadata is substantially consistently and substantially constantly updated and relayed to take into account dynamic changes in conditions.

Advantages of the aspects of the embodiments comprise substantially constant and consistent updating of the source-based dynamic delay metadata depending on the processing that occurs within a given source/transmitter, and the source-based dynamic delay metadata is shared throughout the system. As those of skill in the art can appreciate, most if not all currently available delay adjustments in the industry focus on a fixed delay throughout a system that does not update depending on sources nor is substantially and consistently updated. According to aspects of the embodiments, audio output through an AVR can change depending on whether there is digital signal processor (DSP) applied to a first internal output of the AVR (e.g., a first source signal), and these delays are further compounded by the fact that different DSP modes can result in different delays. Aspects of the embodiments embed the source-based dynamic delay metadata as metadata shared throughout the system, and therefore output devices (for instance amplifiers) can align their outputs by implementing the reported delay within the device.

Figure 3:
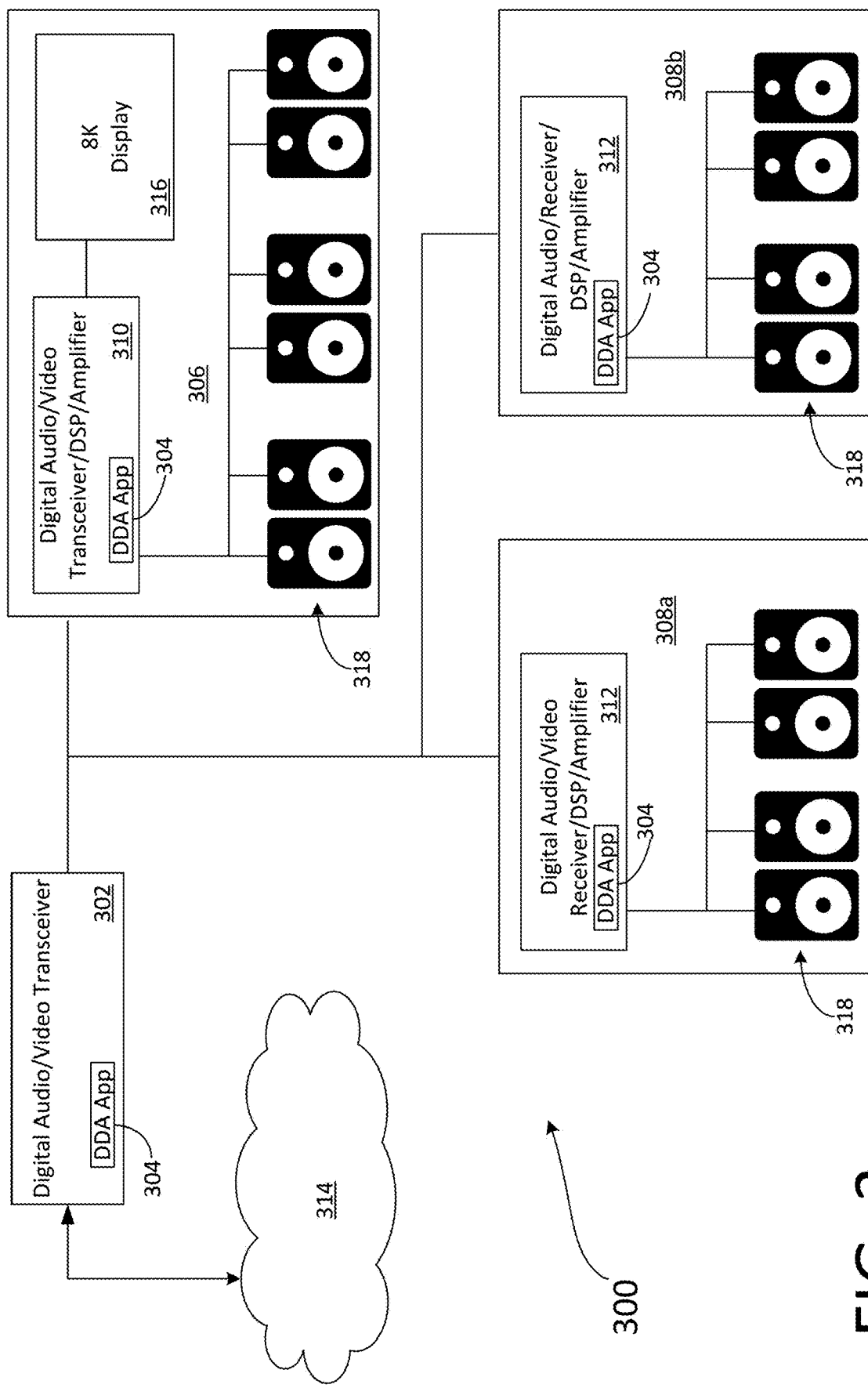
FIG. 3 illustrates a block diagram of an audio/video (AV) distribution system that implements dynamic delay audio adjustment according to aspects of the embodiments.

FIG. 3 illustrates a block diagram of audio/video distribution system that compensates for dynamic delay of audio (AV distribution system) 300 according to aspects of the embodiments. AV distribution system 300 comprises network 316, AC transceiver 302, dynamic delay adjustment (DDA) software application (DDA App) 304, AV room with video display and surround sound loudspeakers 306, room with audio only 308, combined digital AV transceiver, digital signal processor (DSP), and amplifier device 310, combined audio transceiver, DSP, and amplifier 312, video display 316, and loudspeakers 118.

Combined audio and video is received from network 314 by AV transceiver 302, which also contains DDA App 304 according to aspects of the embodiments. AV transceiver 302 is also referred to as a "front end" device, as it is the device that receives the audio and video signals, can perform either or both audio and video processing, but also includes DDA App 304 according to aspects of the embodiments. Network 314 can be the internet, a local area network (LAN), wide area network (WAN), and the like.

As described above, it is known to coordinate and sync audio and video signals so that they play close enough together that any words spoken or sung by actors/actresses appears and sounds natural. However, in multiroom environments, when playing audio alone, it is often the case that different devices will introduce different delays in the audio such that the sounds will be out of sync when broadcast from loudspeakers in between different rooms of a house or building. In addition, even if the exact same devices and same length of cables were to be used, if there are different settings in a digital signal processor, or if surround sound was being used in one room and not another, then significantly different delays can be introduced that can affect broadcast of acoustic audio signals from different rooms' respective loudspeakers. Therefore, according to aspects of the embodiments, a system for introducing dynamically adjusted delays should be implemented in order to maximize the audio listening experience.

According to aspects of the embodiments, dynamic delay adjustments to the digital audio data can take place virtually anywhere, although, for the purposes of this discussion, in fulfillment of the dual purposes of clarity and brevity, discussion has been limited to introducing dynamic delay adjustments to the digital audio signal at a front end device, and a back end device. Furthermore, as those of skill in the art can appreciate, on most digital audio systems, there are for practical purposes only front end devices (where the digital audio signals are received, and initial processing occurs) and back end devices (where digital audio signals are received and further processing can occur prior to amplification and broadcasting by one or more loudspeakers). Still further, as those of skill in the art can appreciate, many of these such devices comprise sophisticated electronics that can include extremely powerful processors and memory, such that software can be readily stored and executed to make adjustments for dynamic delays in the digital audio signals.

Figure 4:
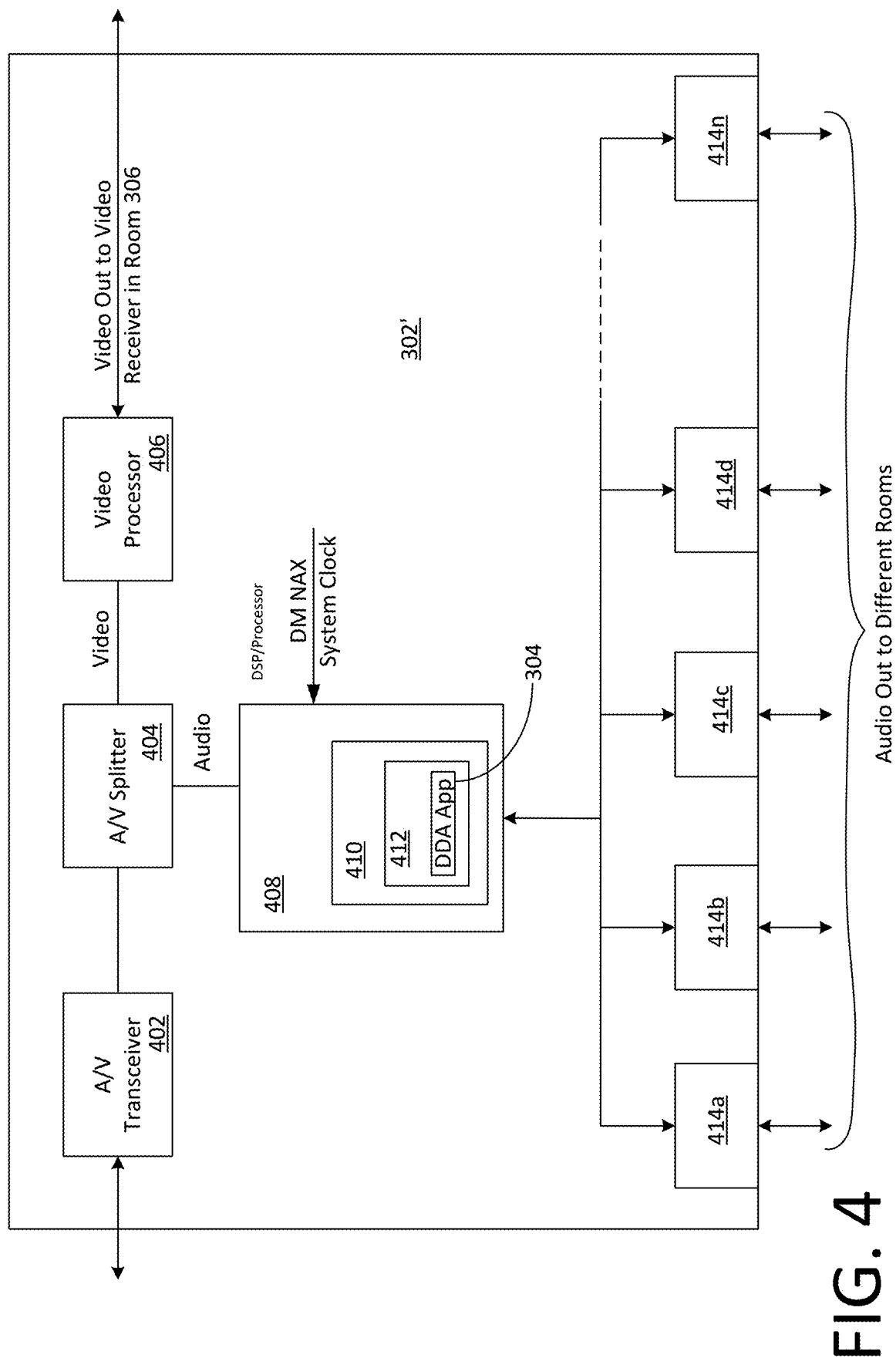
FIG. 4 illustrates a block diagram of a front end device with no delay devices used in the system of FIG. 3 according to aspects of the embodiments.
Figure 5:
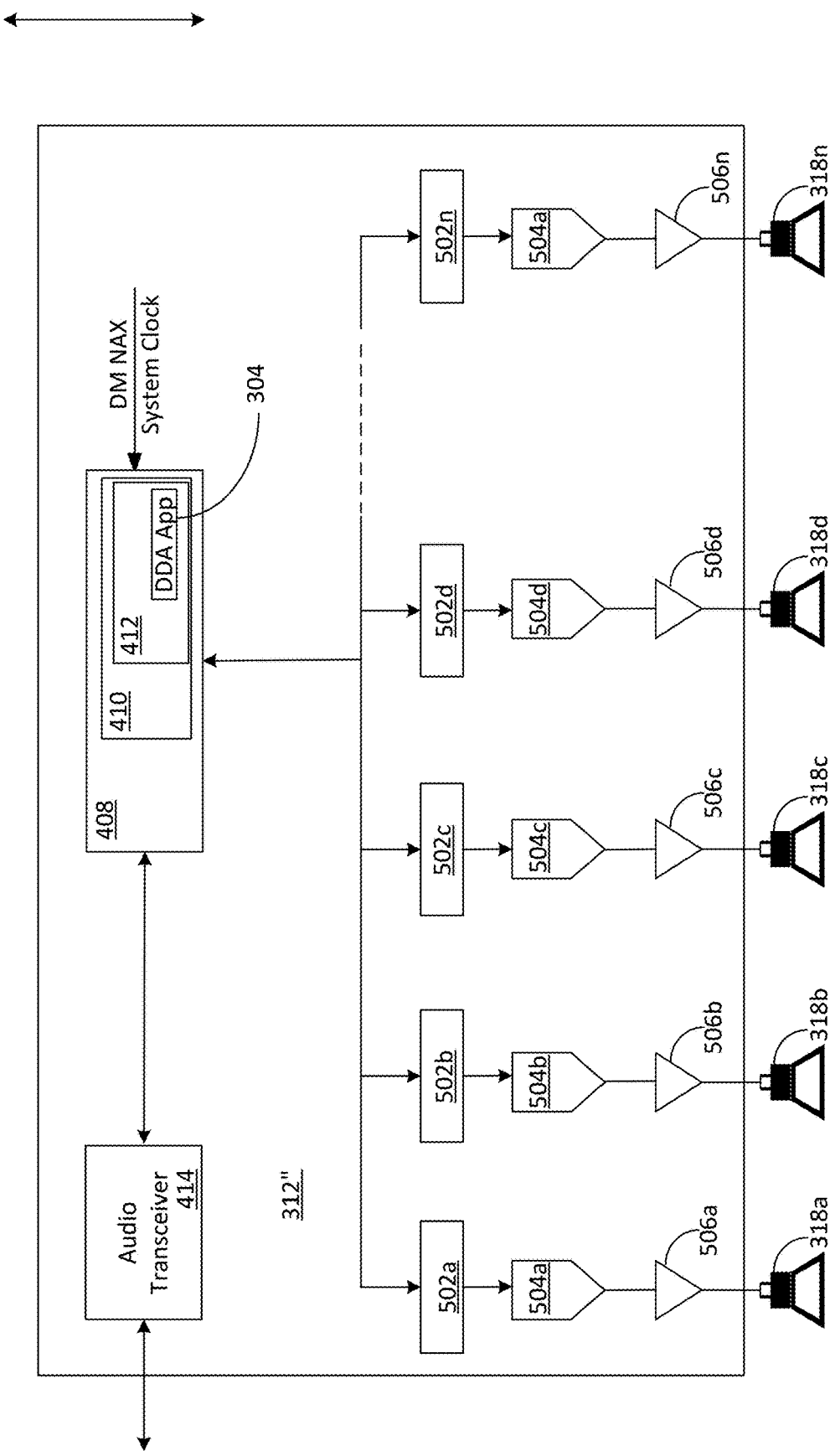
FIG. 5 illustrates a block diagram of a back end device with one or more delay devices for use with the front end device of FIG. 4 as used in the system of FIG. 3 according to aspects of the embodiments.

The devices of FIGS. 4 and 5 illustrate an embodiment of AV distribution system 300 of FIG. 3 wherein dynamic delay adjustments are introduced in the back end device (BE device 312") according to aspects of the embodiments. FIG. 4 illustrates a block diagram of a front end device (digital audio video transceiver (DAV transceiver) 302') with no delay devices used therein, and FIG. 5 illustrates a block diagram of BE device 312" with one or more delay devices 502 for use with DAV transceiver 302 of FIG. 4 as used in audio distribution system 300 of FIG. 3 according to aspects of the embodiments. For the purposes of this discussion, since the front and back end devices are substantially similar but for the inclusion or exclusion of delay devices 502, devices without delay device 502 are noted with a single apostrophe (e.g., 312') and those with delay device 502 are noted with a quotation mark (e.g., 312").

In DAV transceiver 302' a combined audio video signal, or just audio, can be received by AV transceiver 402, and then output to AV splitter 404. AV splitter separates the digital audio signal from the digital video signal, and forwards the video signal to video processor 406 that can perform some video processing as well as transmit the optionally processed video signal to one or more locations such as AV room 306 that includes display 314. The digital audio signal is transmitted by splitter 404 to digital signal processor (DSP) 408 (DSP 408 is optional, as is splitter 404, in which case only digital audio would be received by AV transceiver 402, which means it could just be a digital audio transceiver). DSP 408 contains processor 410, memory 412, and stored within memory 412 is dynamic delay adjustment (DDA) application (DDA App) 304 according to aspects of the embodiments, as a set of executable code that can be executed by processor 410, either alone or in conjunction with other ones of DDA App 304 stored elsewhere within AV distribution system 300, or on network 316.

According to aspects of the embodiments, DDA App 304 in the embodiment illustrated in FIGS. 4 and 5 works in the following manner to introduce dynamically adjusted delays to digital audio signals such that audio broadcast as acoustic waves from loudspeakers 318, wherever they might in a home or office, or some other enterprise location, is broadcast substantially simultaneously, thereby substantially maximizing the audio listening experience.

DDA App 304 can introduce delays in the digital audio signal in several different manners. Although DDA App 304 is shown in several different devices, for the purposes of this discussion, the controlling DDA App 304 will be referred to as the "primary DDA App 304" and others as "secondary DDA App 304" in that secondary DDA Apps 304 respond to commands from primary DDA App 304 according to aspects of the embodiments. According to still further aspects of the embodiments, the primary DDA App 304 does not necessarily need to be located in the front end device, or DAV transceiver 302', though for purposes of this discussion only the case of the primary DDA App 304 being located in DAV transceiver 302' will be considered.

According to an aspect of the embodiments, primary DDA App 304 can transmit a test signal periodically through AV distribution system 300 that includes a universal clock datum through each digital audio distribution channel (i.e., the two or more BE devices 312"). When each secondary DDA App 304 in each BE device 312" receives the test signal, secondary DDA App 304 can transmit back to primary DDA App 304 located in DAV transceiver 302' the time it received its respective test signal, and from that information primary DDA App 304 in DAV transceiver 302' can determine the system delay for each audio distribution channel. Alternatively, secondary DDA App 304 can calculate the actual delay by subtracting the time contained in the test signal from the current actual time when the test signal was received; such time of transit data and universal clock datum can be referred as "metadata."

An audio distribution channel (ADC) is defined as the path between DAV transceiver 302' (which has, according to aspects of the embodiments, DSP 408 (or whatever device contains primary DDA App 304)) to a respective one of at least two BE devices 312" (which has DSP 408 (or another device with a processor and memory) with secondary DDA App 304). Audio distribution channels can be wireless (e.g., Bluetooth, WiFi, NFC, among other types of wireless communications systems), though typically are wired using Ethernet CAT 5 cable, for bi-directional communication capabilities.

Primary DDA App 304 in DAV transceiver 302' then determines a corrective delay for each ADC, and forwards that delay information to each respective secondary DDA App 304 located in respective BE devices 312", which then generates its respective delay in delay devices 502.

FIG. 9 illustrates table 900 that shows the results of ADC delay determinations. In this non-limiting example, there are five ADCs (1-5), shown in first row 902 of Table 900 and each has a respective delay (in milliseconds (ms)) of about 10, 8, 17, 32, and 4 (shown in second row 904 of Table 900). In this case, ADC 4 has the longest delay—and therefore, the other ADCs need to be equalized to it; this is done by adding the difference in delay between each respective channel and the slowest ADC. For example, since ADC 1 has a delay of about 10 ms, to get it to equal 32 ms of delay, 22 ms of delay (32−10=22) must be implemented to the audio prior to being broadcast as acoustic signals from loudspeakers 318 according to aspects of the embodiments.

FIG. 5 illustrates an exemplary BE device 312" that includes a dedicated delay 502 for each loudspeaker 308a-n (though this need not necessarily be the case (i.e., it could be the case that a single delay 502 is all that is needed if the number of loudspeakers 318 is small, or if they are closely located to one another)). Primary DDA App 304 in DAV transceiver 302' can inform secondary DDA App 304 in BE device 312" in several different manners. Primary DDA App 304 can send a separate message (delay message) to each respective secondary DDA App 304. Delay messages can be generated periodically (e.g., once a second, minute, hour, or day, as the case may be, or virtually any other time period), and each secondary DDA App 304 will receive its respective delay message and adjust delays 502 accordingly. Alternatively, delay messages or the information regarding respective delays for each ADC can be added to the digital audio word, and secondary DDA App 304 can obtain the delay by reading the digital audio word, obtaining the delay information, and adjusting delays 502 accordingly. Using the example discussed above, if FIG. 5 were ADC 1, each of delays 502a-n would be set to institute a delay of about 22 ms prior to the digital data being sent to respective ADCs 504a-n.

According to further aspects of the embodiments, the transit time for audio from DAV transceiver 302' to BED 312" can be determined by using delay times for different devices determined prior to installation into AV distribution system 300. That is, DDA App 304 can have access to a set of data that includes audio transit times for different devices; as different devices are added to AV distribution system 300, DDA App 304 becomes aware of them (through polling of the system 300), determines their predetermined audio transit delays, and generates a total transit delay per ADC. As with the determination of the table shown in FIG. 9, once all of the transit times per ADC are determined, primary DDA App 304 ascertains the slowest channel and adds the appropriate delay to the other ADCs (wherein the appropriate delay is the difference between the slowest ADC and each respective delay). If a user changes a setting on a device (e.g., adds a new filter in the DSP, among other setting changes), the device can report back to DDA App 304 the changed setting and change in processing delay, as any changes to audio processing can increase or decrease the processing delay through the respective device. Thus, in this manner, periodic checking of the ADCs can be substantially eliminated or reduced, thereby freeing up valuable processing time and ADC resources.

Figure 6:
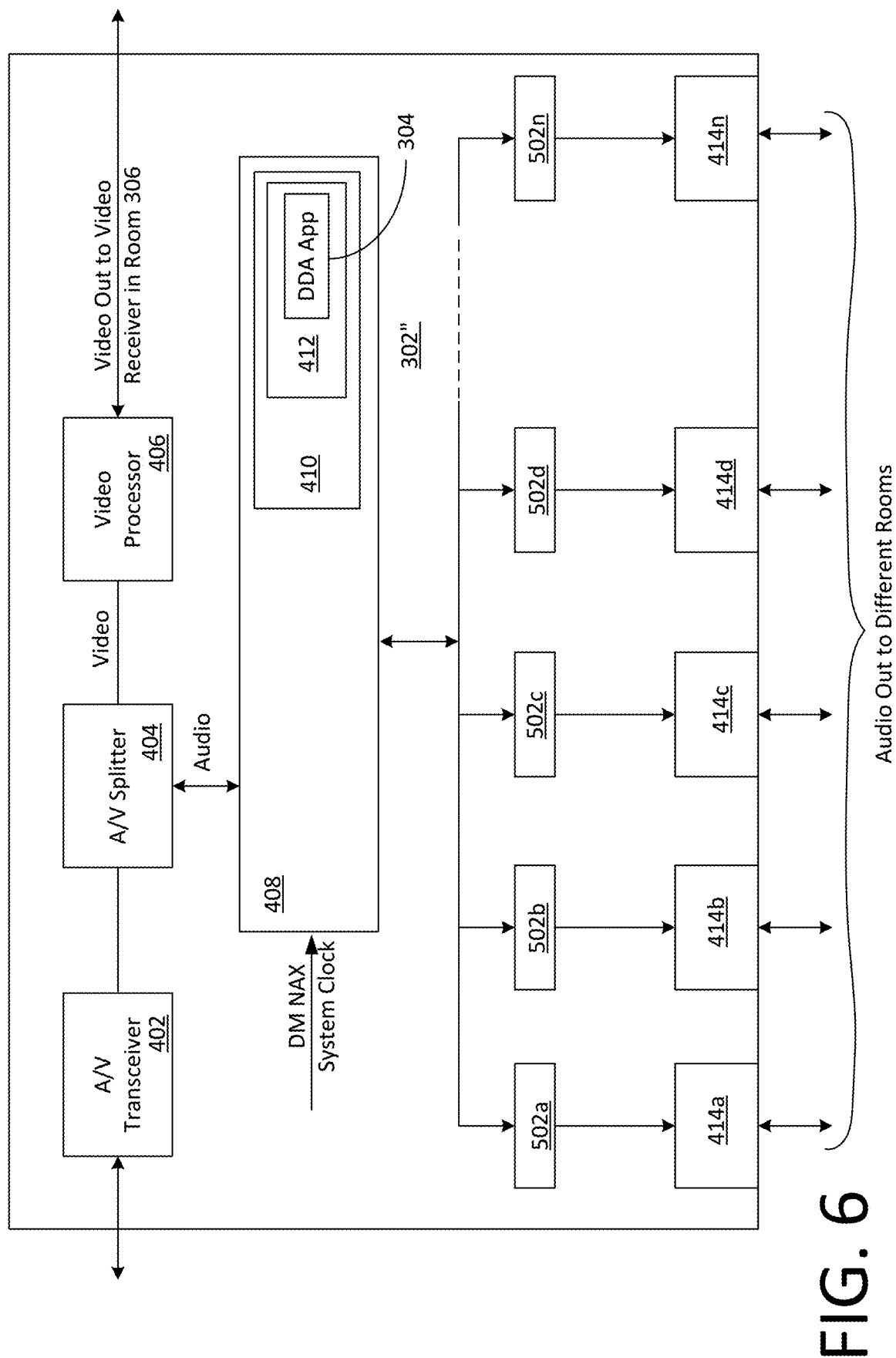
FIG. 6 illustrates a block diagram of a front end device with delay devices used in the system of FIG. 3 according to aspects of the embodiments.
Figure 7:
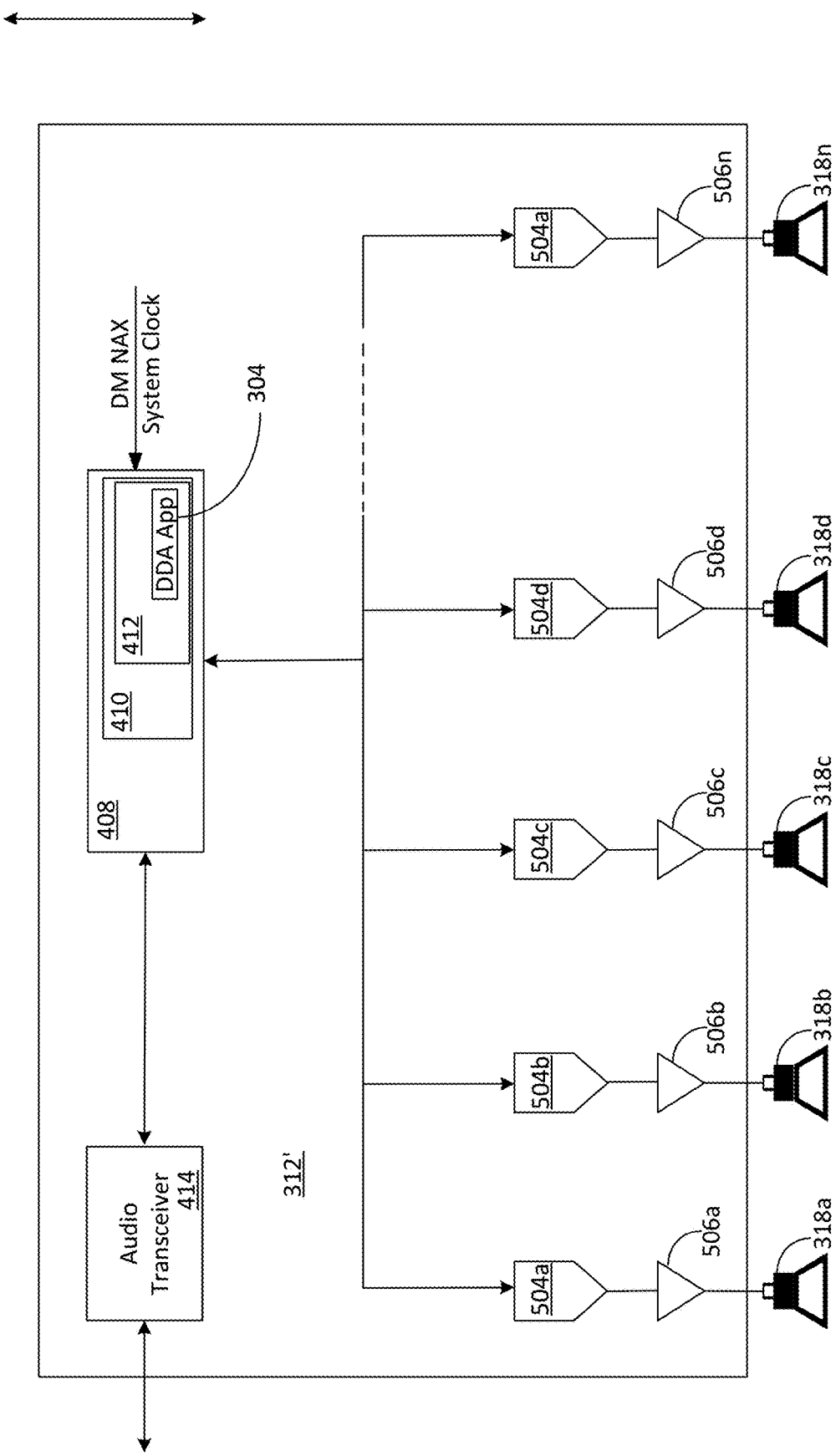
FIG. 7 illustrates a block diagram of a back end device with no delay devices for use with the front end device of FIG. 6 as used in the system of FIG. 3 according to aspects of the embodiments.

Attention is now directed to FIGS. 6 and 7. Wherein FIGS. 4 and 5 illustrated AV distribution system 300 in which delays 502 where located at BE device 512", FIGS. 6 and 7 illustrate delays 502 locates in DAV transceiver 302". FIG. 6 illustrates a block diagram of DAV transceiver 302 with delay devices 502 used in the system of FIG. 3 according to aspects of the embodiments, and FIG. 7 illustrates a block diagram of BE device 312' with no delay devices 502 for use with the front end device of FIG. 6 as used in the system of FIG. 3 according to aspects of the embodiments.

The devices of FIGS. 6 and 7 work substantially similarly to the respective devices of FIGS. 4 and 5, with the exception of the location of delays 502 according to aspects of the embodiments. As described above, primary DDA App 304 (which, as described above, could be located substantially in any device, but for the purposes of this discussion is located in DAV transceiver 302"), determines the transmission delay for digital audio for each respective ADC and then determines the amount of delay that needs to be added to each ADC so that the delay for each ADC is substantially similar. The delay, as those of skill in the art can now appreciate, can be added substantially anywhere within the ADC, but for the purposes of this discussion, in fulfillment of the dual purposes of clarity and brevity, the delay has been shown to be in either BE device 312" or DAV transceiver 302" according to aspects of the embodiments. Thus, as shown in FIG. 6, delays 502a-n are shown in DAV transceiver 302" and primary DDA App 304, which is located in DSP 408 of DAV transceiver 302", determines the delay for each ADC, identifies the slowest ADC, and then equalizes all of the other ADCs by adding an appropriate amount of delay in the manner as described above to each delay 502.

Figure 8:
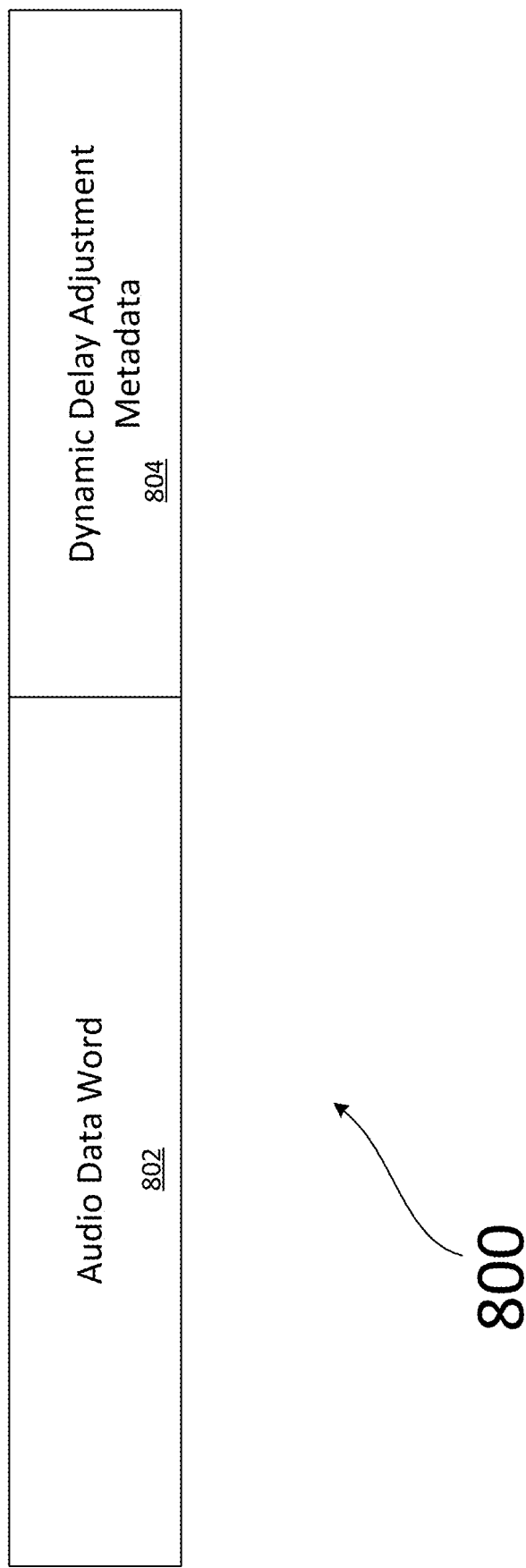
FIG. 8 illustrates a digital audio data word for use with the aspects of the embodiments.

FIG. 8 illustrates digital audio data word 800 for use with the aspects of the embodiments. Digital audio data word 800 comprises audio data word portion 802 and dynamic delay adjustment metadata portion 804 according to aspects of the embodiments. As discussed above, primary DDA App 304 determines and transmits delay information to secondary DDA App 304 using either a dedicated word, or can insert the delay information using the digital audio data word in the form shown in FIG. 8.

Figure 10A:
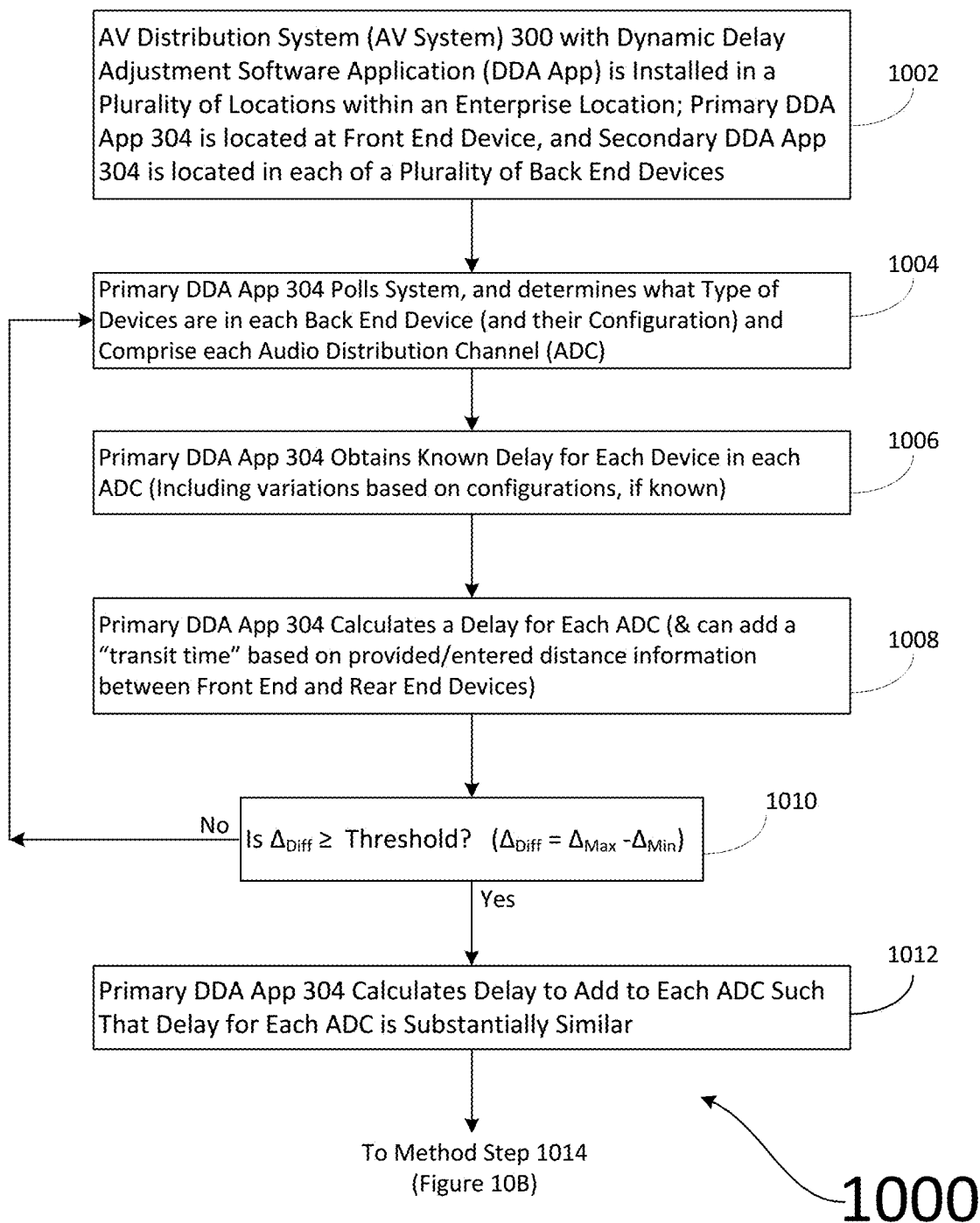
FIGS. 10A and 10B illustrate a flow chart of a method for dynamically adjusting delay in an audio system such that audio from two or more locations is broadcast substantially simultaneously, wherein predetermined delays are used in estimating delays in each audio distribution channel according to aspects of the embodiments.
Figure 10B:
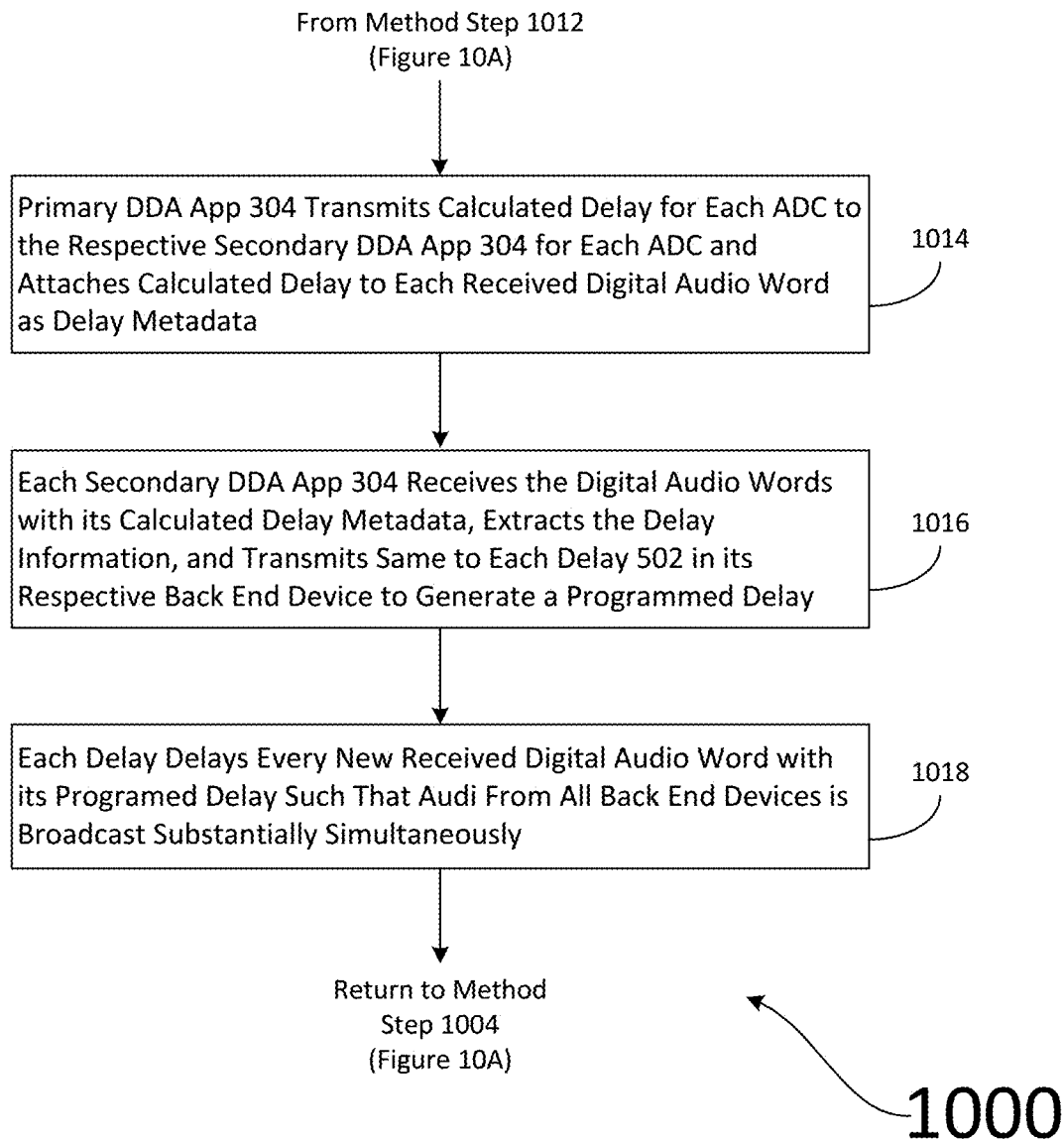

FIGS. 10A and 10B illustrate a flow chart of a method for dynamically adjusting delay in an audio system such that audio from two or more locations is broadcast substantially simultaneously, wherein predetermined delays are used in estimating delays in each audio distribution channel (method 1000) according to aspects of the embodiments.

Method 1000 begins with method step 1002, wherein AV System 300 with DDA App 304 is installed in a plurality of locations in an enterprise location. An enterprise location comprises a home, office building, government building, a complex of buildings, and the like. AV system 300, as described above, comprises at least one front end device that includes at least a digital audio receiver that includes a processor and memory, within which can be stored primary DDA App 304. AV system 300 further comprises at least two back end devices, each of which includes a device that includes a processor and associated memory, and at least one digital audio delay device (delay 502). Further in method step 1002, primary DDA App 304 is located at a front end device, and secondary DDA App 304 is located in each of a plurality of back end devices In method step 1004, primary DDA App 304 polls AV system 300 to determine what devices are part of AV system 300, and which devices are part of each ADC. Alternatively, a user can interface with DDA App 304 via a computer interface and enter the device information directly.

In method step 1006, primary DDA App 304 communicates with each device in each ADC, or finds each device in a locally or remotely stored database, to determine the digital audio processing delay of each device. Further in method step 1006, primary DDA App 304 also determines the present configuration of each of the devices, in the event that different configurations can entail different delays, as filtering and other audio processing functions are included in the audio processing paths. In method step 1008, primary DDA App 304 calculates a total digital audio data transmission delay through each ADC according to aspects of the embodiments. According to further aspects of the embodiments, a user can enter cable distances for each ADC to further refine the total digital audio transmission delay for each ADC, and wherein primary DDA App 304 can determine the additional delay based on cable types and lengths.

In decision step 1010, primary DDA App 304 performs a series of calculations to determine whether delays need to be added to the ADCs, and if so, how much. Referring back to FIG. 9, primary DDA App 304 calculates a delay to add to each ADC according to the following:

$$\text{Delay}_{CH\#} = \delta_{CH\#MAX} - \delta_{CH\#} \qquad \text{Equation 1:}$$

where $\delta\text{Delay}_{CH\#}$=The difference in delay between the particular ADC number (CH#) and the ADC with the longest delay;

$\delta_{CH\#MAX}$=The maximum delay (typically in milliseconds (ms)); and $\delta_{CH\#}$=The delay for a particular ADC (CH#).

Referring back again to FIG. 9, in a non-limiting example, it can be seen that $\delta_{CH\#MAX}$=32 ms, with ADC4 being the channel with the longest delay.

Primary DDA App 304 then determines the delays to add to each channel to substantially equalize the delays among the ADCs (i.e., calculates Equation 1, the results of which are shown in line 902; $ADC_1$=22 ms; $ADC_2$=24 ms; $ADC_3$=15 ms, and $ADC_5$=28 ms).

Primary DDA App 304 then determines the difference in the delay determinations, according to the following, to ascertain whether there is a significant difference in when audio will be played out from the different loudspeakers from different ADCs. If the difference in time (i.e., delays) when the audio is broadcast is less then a certain predetermined threshold, then no delays need to be added because most people will not be able to discern the difference. But at some point—the predetermined threshold—the different times (which corresponds to the different delays) that audio is broadcast from different loudspeakers will be noticeable, and will degrade the audio listening experience. Thus, primary DDA App 304 performs the following calculations:

$$\Delta_{Diff} = \text{Delay}_{CH\#MAX} - \text{Delay}_{CH\#MIN} \quad \text{Equation 2:}$$

where,
Delay$_{CH\#MAX}$ and Delay$_{CH\#MIN}$ were determined from calculating Equation 1 between all of the ADCs.

Referring back again to FIG. 9, in a non-limiting example, it can be seen that Delay$_{CH\#MAX}$=28 (ADC$_5$), and Delay$_{CH\#MIN}$=15 (ADC$_3$), for a $\Delta_{Diff}$=13 ms.

Primary DDA App 304 then performs the following:

$$\Delta_{Diff} \geq \text{Predetermined Delay Threshold?} \quad \text{Equation 3:}$$

If $\Delta_{Diff}$ is greater than or equal to the predetermined delay threshold ("Yes" path from decision step 1010), then primary DDA App 304 will add the appropriate delays, and method 1000 proceeds to method step 1012. The appropriate delays are determined—in a non-limiting example—by the process shown in table 900 illustrated in FIG. 9 and Equation 1 from above (each delay per channel is shown in third row 906 of Table 900). If $\Delta_{Diff}$ is less than the predetermined delay threshold ("No" path from decision step 1010), then no delays are added to any of the digital audio signals, and method 1000 returns to method step 1004.

As described above, primary DDA App 304 determines the difference between the largest and smallest difference (difference in delays). If the difference in delays is below a first predetermined threshold, then no adjustments to the transmission of digital audio signals needs to occur—meaning no delays in delay 502. A small enough difference in differences means the digital audio data broadcast as acoustic signals from different sets of loudspeakers is below a perceptible audio threshold that the brain would recognize as being incongruent. If the differences were above the predetermined threshold, then the ordinary human listener would most likely discern a problem, and the audible experience would degrade and be noticeable and less enjoyable.

According to aspects of the embodiments the total transit time includes processing in devices that are part of the ADC, and is representative of the different times acoustic audio will be broadcast from each loudspeaker that makes up a back end device. If the longest total transit time is below a predetermined threshold (e.g., a threshold that indicates no acoustic hearing or listening anomalies because the differences in playback is so small as to be unnoticeable), then no further corrective steps are taken ("No" path from decision step 1010), and method 1000 returns to method step 1004.

In method step 1012, primary DDA App 304 adds the calculated delay per ADC to each digital audio word as audio data metadata (e.g., as shown in FIG. 8), that is then transmitted to each back end device (method step 1014) and a secondary DDA App 304 located in the respective back end device.

In method step 1016, the respective secondary DDA App 304 extracts the calculated delay per ADC metadata for its respective ADC and programs the one or more delays 502 in the back end device with the calculated delay per ADC. In method step 1018, the digital audio data that is received by the back end device will be delayed by delay 502 according to the programmed amount of delay it received in method step 1016. The delay amount, when added to the existing processing delay of the devices in the respective back end device (if any), will cause the acoustic audio signals from the respective back end device to be broadcast substantially simultaneously with the ADC that has the greatest transmission delay, as determined above in method step 1008. Method 1000 then returns to method step 1004.

Figure 11A:
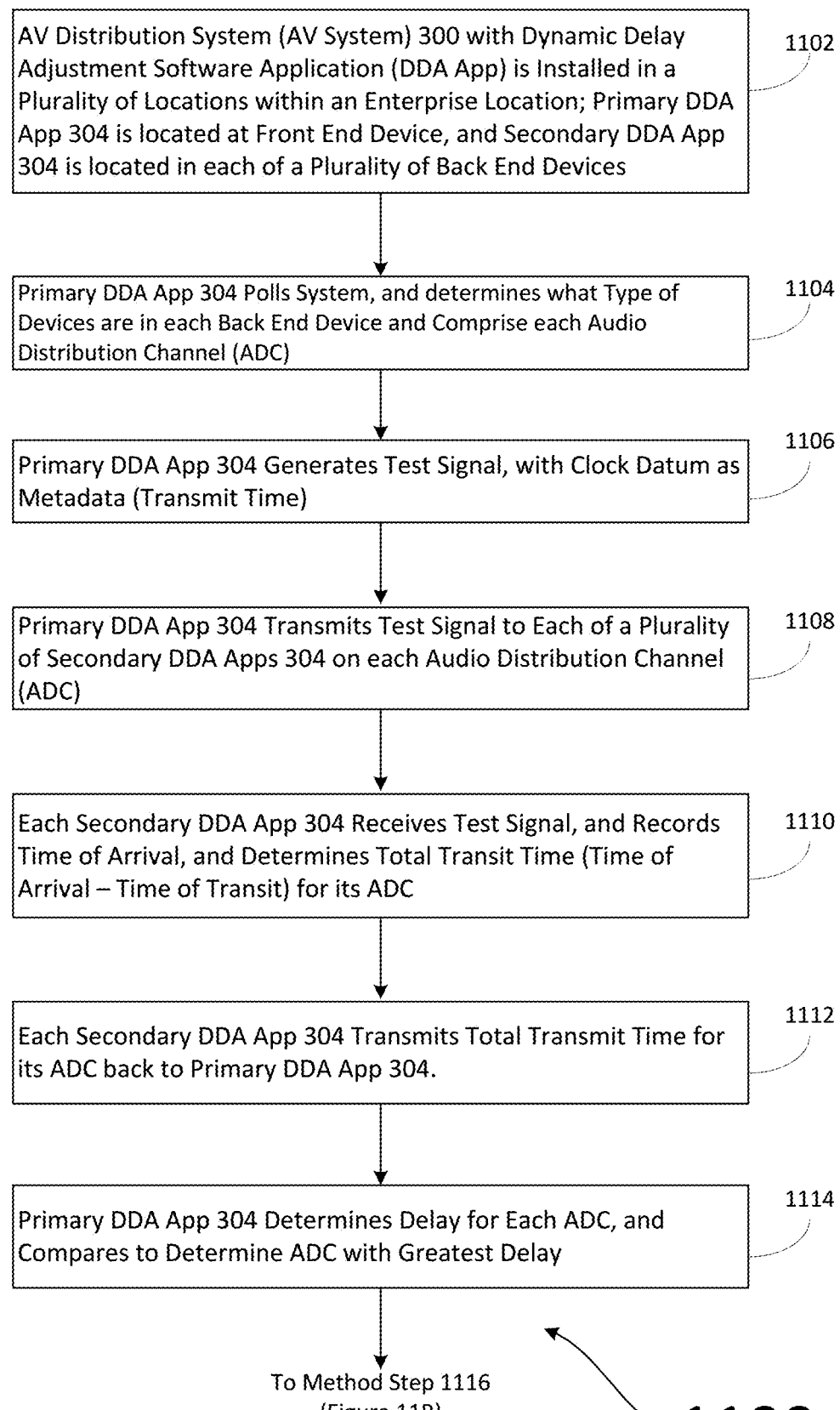
FIGS. 11A and 11B illustrate a flow chart of a method for dynamically adjusting delay in an audio system such that audio from two or more locations is broadcast substantially simultaneously, wherein test signals are generated periodically for estimating delays in each audio distribution channel according to aspects of the embodiments.
Figure 11B:
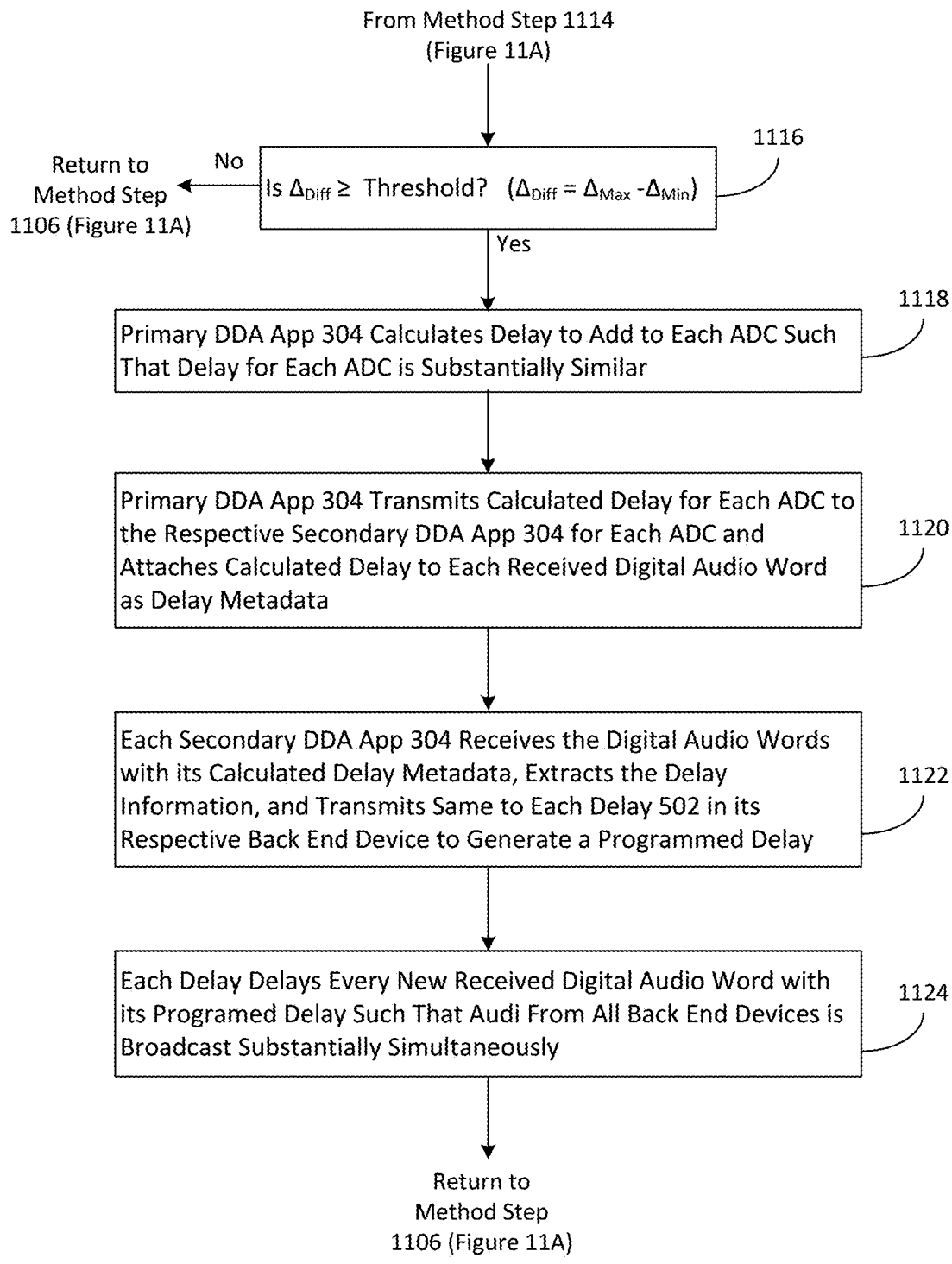

FIGS. 11A and 11B illustrate a flow chart of a method for dynamically adjusting delay in an audio system such that audio from two or more locations is broadcast substantially simultaneously, wherein test signals are generated periodically for estimating delays in each audio distribution channel (method 1100) according to aspects of the embodiments.

Method 1100 begins with method step 1102, wherein AV System 300 with DDA App 304 is installed in a plurality of locations in an enterprise location. An enterprise location comprises a home, office building, government building, a complex of buildings, and the like. AV system 300, as described above, comprises at least one front end device that includes at least a digital audio receiver that includes a processor and memory, within which can be stored primary DDA App 304. AV system 300 further comprises at least two back end devices, each of which includes a device that includes a processor and associated memory, and at least one digital audio delay device (delay 502). Further in method step 1102, primary DDA App 304 is located at a front end device, and secondary DDA App 304 is located in each of a plurality of back end devices.

In method step 1104, primary DDA App 304 polls AV system 300 to determine what devices are part of AV system 300, and which devices are part of each ADC. Alternatively, a user can interface with DDA App 304 via a computer interface and enter the device information directly.

In method step 1106, primary DDA App 304 generates a test signal, with clock datum as metadata. In method step 1108, the test signal is transmitted through each ADC to each secondary DDA App 304 located in the back end devices.

In method step 1110, each secondary DDA App 304 receives the test signal with the clock datum as metadata, and records a time of arrival. Each secondary DDA App 304 then calculates a total transit time (Total Transit Time=Time of Arrival−Time of Transit).

In method step 1112, each secondary DDA App 304 transmits the total transit time for its ADC back to primary DDA App 304.

In method step 1114, primary DDA App 304 determines the delay for each ADC (total transit time per ADC), and compares all of them to determine which has the longest total transit time (i.e., the greatest delay).

In decision step 1116, primary DDA App 304 performs a series of calculations to determine whether delays need to be added to the ADCs, and if so, how much. Referring back to FIG. 9, primary DDA App 304 calculates a delay to add to each ADC according to the following:

$$\text{Delay}_{CH\#} = \delta_{CH\#MAX} - \delta_{CH\#} \quad \text{Equation 1:}$$

where
Delay$_{CH\#}$=The difference in delay between the particular ADC number (CH#) and the ADC with the longest delay;
$\delta_{CH\#MAX}$=The maximum delay (typically in milliseconds (ms)); and
$\delta_{CH\#}$=The delay for a particular ADC (CH#).

Referring back again to FIG. 9, in a non-limiting example, it can be seen that $\delta_{CH\#MAX}$=32 ms, with ADC4 being the channel with the longest delay.

Primary DDA App 304 then determines the delays to add to each channel to substantially equalize the delays among the ADCs (i.e., calculates Equation 1, the results of which are shown in line 902; ADC$_1$=22 ms; ADC$_2$=24 ms; ADC$_3$=15 ms, and ADC$_5$=28 ms).

Primary DDA App 304 then determines the difference in the delay determinations, according to the following, to ascertain whether there is a significant difference in when audio will be played out from the different loudspeakers from different ADCs. If the difference in time (i.e., delays) when the audio is broadcast is less then a certain predetermined threshold, then no delays need to be added because most people will not be able to discern the difference. But at some point—the predetermined threshold—the different times (which corresponds to the different delays) that audio is broadcast from different loudspeakers will be noticeable, and will degrade the audio listening experience. Thus, primary DDA App 304 performs the following calculations:

$$\Delta_{Diff} = \text{Delay}_{CH\#MAX} - \text{Delay}_{CH\#MIN} \quad \text{Equation 2:}$$

where, $\text{Delay}_{CH\#MAX}$ and $\text{Delay}_{CH\#MIN}$ were determined from calculating Equation 1 between all of the ADCs.

Referring back again to FIG. 9, in a non-limiting example, it can be seen that $\text{Delay}_{CH\#MAX}=28$ (ADC$_5$), and $\text{Delay}_{CH\#MIN}=15$ (ADC$_3$), for a $\Delta_{Diff}=13$ ms.

Primary DDA App 304 then performs the following:

$$\Delta_{Diff} \geq \text{Predetermined Delay Threshold?} \quad \text{Equation 3:}$$

If $\Delta_{Diff}$ is greater than or equal to the predetermined delay threshold ("Yes" path from decision step 1116), then primary DDA App 304 will add the appropriate delays, and method 1100 proceeds to method step 1118. The appropriate delays are determined—in a non-limiting example—by the process shown in table 900 illustrated in FIG. 9 and Equation 1 from above. If $\Delta_{Diff}$ is less than the predetermined delay threshold ("No" path from decision step 1116), then no delays are added to any of the digital audio signals, and method 1100 returns to method step 1106.

As described above, primary DDA App 304 determines the difference between the largest and smallest difference (difference in delays). If the difference in delays is below a first predetermined threshold, then no adjustments to the transmission of digital audio signals needs to occur—meaning no delays in delay 502. A small enough difference in differences means the digital audio data broadcast as acoustic signals from different sets of loudspeakers is below a perceptible audio threshold that the brain would recognize as being incongruent. If the differences were above the predetermined threshold, then the ordinary human listener would most likely discern a problem, and the audible experience would degrade and be noticeable and less enjoyable.

According to aspects of the embodiments the total transit time includes processing in devices that are part of the ADC, and is representative of the different times acoustic audio will be broadcast from each loudspeaker that makes up a back end device. If the longest total transit time is below a predetermined threshold (e.g., a threshold that indicates no acoustic hearing or listening anomalies because the differences in playback is so small as to be unnoticeable), then no further corrective steps are taken ("No" path from decision step 1116), and method 1100 returns to method step 1106.

In method step 1118, primary DDA App 304 adds the calculated delay per ADC to each digital audio word as audio data metadata (e.g., as shown in FIG. 8), that is then transmitted to each back end device (method step 1120) and a secondary DDA App 304 located in the respective back end device.

In method step 1122, the respective secondary DDA App 304 extracts the calculated delay per ADC metadata for its respective ADC and programs the one or more delays 502 in the back end device with the calculated delay per ADC. In method step 1124, the digital audio data that is received by the back end device will be delayed by delay 502 according to the programmed amount of delay it received in method step 1122. The delay amount, when added to the existing processing delay of the devices in the respective back end device (if any), will cause the acoustic audio signals from the respective back end device to be broadcast substantially simultaneously with the ADC that has the greatest transmission delay, as determined above in method step 1114. Method 1100 then returns to method step 1106.

Figure 12:
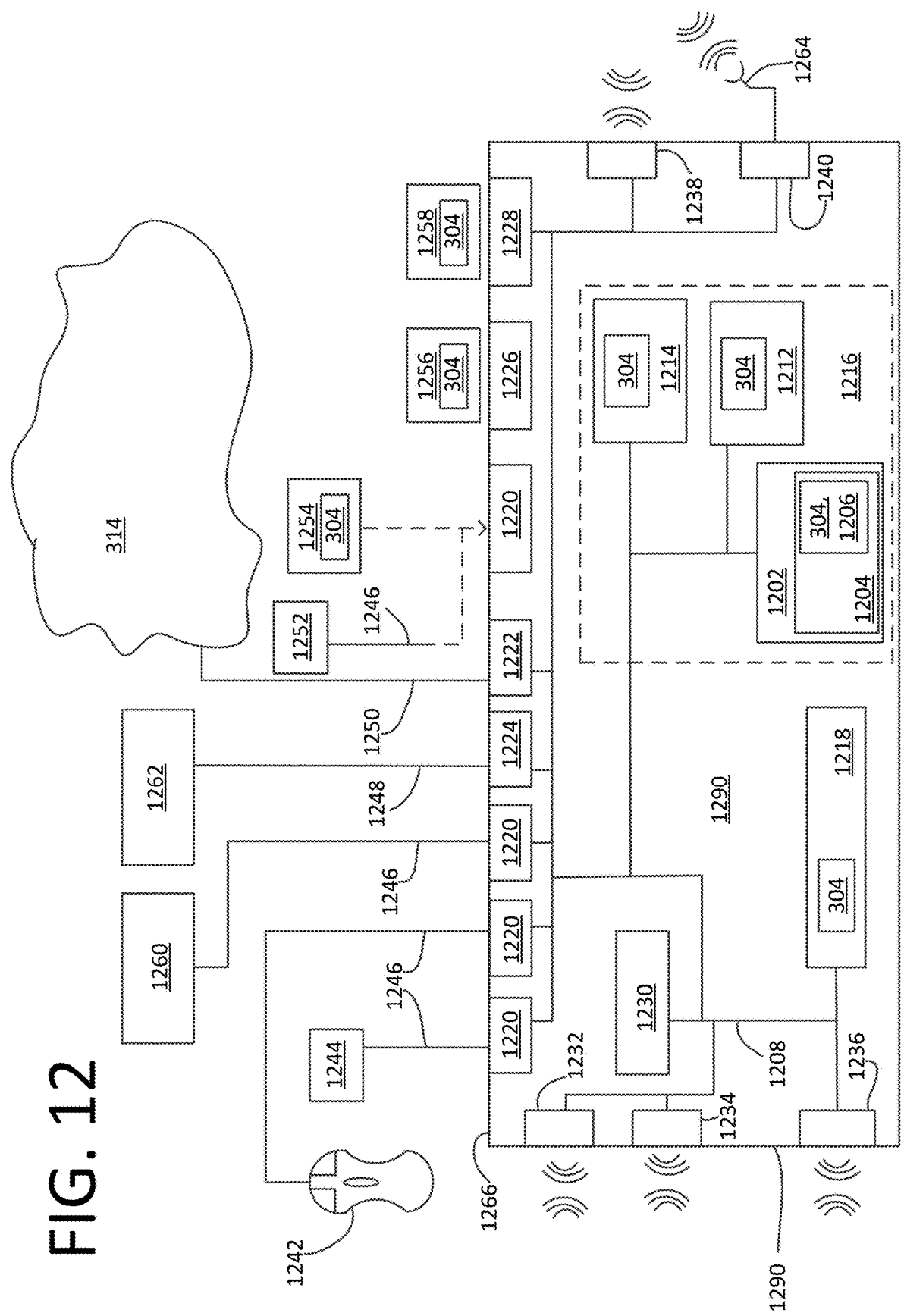
FIG. 12 illustrates a block diagram of the major components of a personal computer (PC), server, laptop, personal electronic device (PED), personal digital assistant (PDA), tablet (e.g., iPad), digital audio video transceiver, back end (audio) device, or any other computer (herein after, "computer") suitable for use to implement the methods of FIGS. 10A and 10, and 11A and 11B, among others, for dynamically adjusting delay in an audio system according to aspects of the embodiments.

FIG. 12 illustrates a block diagram of the major components of a personal computer (PC), server, laptop, personal electronic device (PED), personal digital assistant (PDA), tablet (e.g., iPad), DAV Transceiver 302/310, BED 312, or any other computer 1290 (herein after, "computer 1290") suitable for use to implement methods 1000, 1100 among others, for dynamically adjusting delay in an audio system according to aspects of the embodiments.

Computer 1290 comprises, among other items, a shell/box 1266, integrated display/touch-screen 1230 (though not used in every application of the computer), internal data/command bus (bus) 1208, printed circuit board (PCB) 1216, and one or more processors 1202, with processor internal memory 1204 (which can be typically read only memory (ROM) and/or random access memory (RAM)). Those of ordinary skill in the art can appreciate that in modern computer systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application. Computer 1290 further comprises multiple input/output ports, such as universal serial bus (USB) ports 1220, Ethernet ports 1222, and video graphics array (VGA) ports/high definition multimedia interface (HDMI) ports 1224, among other types. Further, computer 1290 includes externally accessible drives such as compact disk (CD)/digital versatile disk (DVD) read/write (RW) (CD/DVD/RW) drive 1226, and floppy diskette drive 1228 (though less used currently, some computers still include this type of interface). Computer 1290 still further includes wireless communication apparatus, such as one or more of the following: Wi-Fi transceiver 1232, BlueTooth (BT) transceiver 1234, near field communications (NFC) transceiver 1236, third generation (3G)/fourth Generation (4G)/long term evolution (LTE)/fifth generation (5G) transceiver (cellular transceiver) 1238, communications satellite/global positioning system (satellite) transceiver 1240, and antenna 1264.

Internal memory that is located on PCB 1216 itself can comprise hard disk drive (HDD) 1218 (these can include conventional magnetic storage media, but, as is becoming increasingly more prevalent, can include flash drive memory 1254, among other types), ROM 1212 (these can include electrically erasable programmable ROM (EEPROMs), ultra-violet erasable PROMs (UVPROMs), among other types), and RAM 1214. Usable USB port 1220 is flash drive memory 1254, and usable with CD/DVD/RW drive 1226 are CD/DVD diskettes (CD/DVD) 1256 (which can be both read and write-able). Usable with floppy diskette drive 1228 are floppy diskettes 1258. External memory storage device 1252 can be used to store data and programs external to computer 1290, and can itself comprise another hard disk drive 1218, flash drive memory 1254, among other types of memory storage. External memory storage device 1252 is connectable to computer 1290 via USB cable 1246. Each of the memory storage devices, or the memory storage media (1406, 1218, 1212, 1214, 1252, 1254, 1256, and 1258, among others), can contain parts or components, or in its entirety, executable software programming code or application that has been termed DDA App 304 according to aspects of the embodiments, which can implement part or all of the portions of methods 1000, 1100 among other methods not shown, described herein.

In addition to the above described components, computer 1290 also comprises keyboard 1260, external display 1262, printer/scanner/fax machine 1244, and mouse 1242 (although not technically part of the computer 1290, the peripheral components as shown in FIGS. 12 (1252, 1262, 1260, 1242, 1254, 1256, 1258, 1246, 1250, 1244, and 1248) are adapted for use with computer 1290 that for purposes of this discussion they shall be considered as being part of the computer 1290). Other cable types that can be used with computer 1290 include RS 232, among others, not shown, that can be used for one or more of the connections between computer 1290 and the peripheral components described herein. Keyboard 1260, and mouse 1242 are connectable to computer 1290 via USB cable 1246, and external display 1262 is connectible to computer 1290 via VGA cable/HDMI cable 1248. Computer 1290 is connectible to network 1210 via Ethernet port 1222 and Ethernet cable 1250 via a router and modulator-demodulator (MODEM) and internet service provider, none of which are shown in FIG. 12. All of the immediately aforementioned components (1224, 1252, 1262, 1260, 1242, 1254, 1256, 1258, 1246, 1250, and 1244) are known to those of ordinary skill in the art, and this description includes all known and future variants of these types of devices.

External display 1262 can be any type of currently available display or presentation screen, such as liquid crystal displays (LCDs), light emitting diode displays (LEDs), plasma displays, cathode ray tubes (CRTs), among others (including touch screen displays). In addition to the user interface mechanism such as mouse 1242, computer 1290 can further include a microphone, touch pad, joystick, touch screen, voice-recognition system, among other interactive inter-communicative devices/programs, which can be used to enter data and voice, and which all of are currently available and thus a detailed discussion thereof has been omitted in fulfillment of the dual purposes of clarity and brevity.

As mentioned above, computer 1290 further comprises a plurality of wireless transceiver devices, such as Wi-Fi transceiver 1232, BT transceiver 1234, NFC transceiver 1236, cellular transceiver 1238, satellite transceiver 1240, and antenna 1264. While each of Wi-Fi transceiver 1232, BT transceiver 1234, NFC transceiver 1236, cellular transceiver 1238, and satellite transceiver 1240 has their own specialized functions, each can also be used for other types of communications, such as accessing a cellular service provider (not shown), accessing network 1210 (which can include the Internet), texting, emailing, among other types of communications and data/voice transfers/exchanges, as known to those of skill in the art. Each of Wi-Fi transceiver 1232, BT transceiver 1234, NFC transceiver 1236, cellular transceiver 1238, satellite transceiver 1240 includes a transmitting and receiving device, and a specialized antenna, although in some instances, one antenna can be shared by one or more of Wi-Fi transceiver 1232, BT transceiver 1234, NFC transceiver 1236, cellular transceiver 1238, and satellite transceiver 1240. Alternatively, one or more of Wi-Fi transceiver 1232, BT transceiver 1234, NFC transceiver 1236, cellular transceiver 1238, and satellite transceiver 1240 will have a specialized antenna, such as satellite transceiver 1240 to which is electrically connected at least one antenna 1264.

In addition, computer 1290 can access network 314 (of which the Internet can be part of, as shown and described in reference to FIG. 13, below), either through a hard wired connection such as Ethernet port 1222 as described above, or wirelessly via Wi-Fi transceiver 1232, cellular transceiver 1238 and/or satellite transceiver 1240 (and their respective antennas) according to aspects of the embodiments. Computer 1290 can also be part of a larger network configuration as in a global area network (GAN) (e.g., internet), which ultimately allows connection to various landlines.

According to further aspects of the embodiments, integrated touch screen display 1230, keyboard 1260, mouse 1242, and external display 1262 (if in the form of a touch screen), can provide a means for a user to enter commands, data, digital, and analog information into the computer 1290. Integrated and external displays 1230, 1262 can be used to show visual representations of acquired data, and the status of applications that can be running, among other things.

Bus 1208 provides a data/command pathway for items such as: the transfer and storage of data/commands between processor 1202, Wi-Fi transceiver 1232, BT transceiver 1234, NFC transceiver 1236, cellular transceiver 1238, satellite transceiver 1240, integrated display 1230, USB port 1220, Ethernet port 1222, VGA/HDMI port 1224, CD/DVD/RW drive 1226, floppy diskette drive 1228, and processor internal memory 1204. Through bus 1208, data can be accessed that is stored in internal memory 1204. Processor 1202 can send information for visual display to either or both of integrated and external displays 1230, 1262, and the user can send commands to the computer operating system (operating system (OS)) 1206 that can reside in processor internal memory 1204 of processor 1202, or any of the other memory devices (1256, 1258, 1218, 1212, and 1214).

Computer 1290, and either internal memories 1204, 1212, 1214, and 1218, or external memories 1252, 1254, 1256 and 1258, can be used to store computer code that when executed, implements methods 1000, 1100, as well as other methods not shown and discussed, methods 1000, 1100 among others, for dynamically adjusting delay in an audio system according to aspects of the embodiments. Hardware, firmware, software, or a combination thereof can be used to perform the various steps and operations described herein. According to aspects of the embodiments, DDA App 304 for carrying out the above discussed steps can be stored and distributed on multi-media storage devices such as devices 1218, 1212, 1214, 1254, 1256 and/or 1258 (described above) or other form of media capable of portably storing information. Storage media 1254, 1256 and/or 1258 can be inserted into, and read by devices such as USB port 1220, CD/DVD/RW drive 1226, and floppy disk drive 1228, respectively.

As also will be appreciated by one skilled in the art, the various functional aspects of the aspects of the embodiments can be embodied in a wireless communication device, a telecommunication network, or as a method or in a computer program product. Accordingly, aspects of embodiments can take the form of an entirely hardware embodiment or an embodiment combining hardware and software aspects. Further, the aspects of embodiments can take the form of a computer program product stored on a computer-readable storage medium having computer-readable instructions embodied in the medium. Any suitable computer-readable medium can be utilized, including hard disks, CD-ROMs, DVDs, optical storage devices, or magnetic storage devices such a floppy disk or magnetic tape. Other non-limiting examples of computer-readable media include flash-type memories or other known types of memories.

Further, those of ordinary skill in the art in the field of the aspects of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the aspects of the embodiments, and as such has been omitted for the dual purposes of brevity and clarity. However, the systems and methods discussed herein can be implemented as discussed and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and non-volatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CD-ROMs, DVDs or other optical disk storage, magnetic cassettes, magnetic tape, magnetic disk storage or other magnetic storage devices, or any other medium which can be used to store the desired information, and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as ROM and/or RAM. A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

Aspects of the embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired, or wireless data transmission through the Internet). Also, functional programs, codes, and code segments to, when implemented in suitable electronic hardware, accomplish or support exercising certain elements of the appended claims can be readily construed by programmers skilled in the art to which the aspects of the embodiments pertains.

The disclosed aspects of the embodiments provide a system and method for dynamically adjusting delay in an audio system according to aspects of the embodiments on one or more computers 1290. It should be understood that this description is not intended to limit aspects of the embodiments. On the contrary, aspects of the embodiments are intended to cover alternatives, modifications, and equivalents, which are included in the spirit and scope of the aspects of the embodiments as defined by the appended claims. Further, in the detailed description of the aspects of the embodiments, numerous specific details are set forth to provide a comprehensive understanding of the claimed aspects of the embodiments. However, one skilled in the art would understand that various aspects of the embodiments can be practiced without such specific details.

Figure 13:
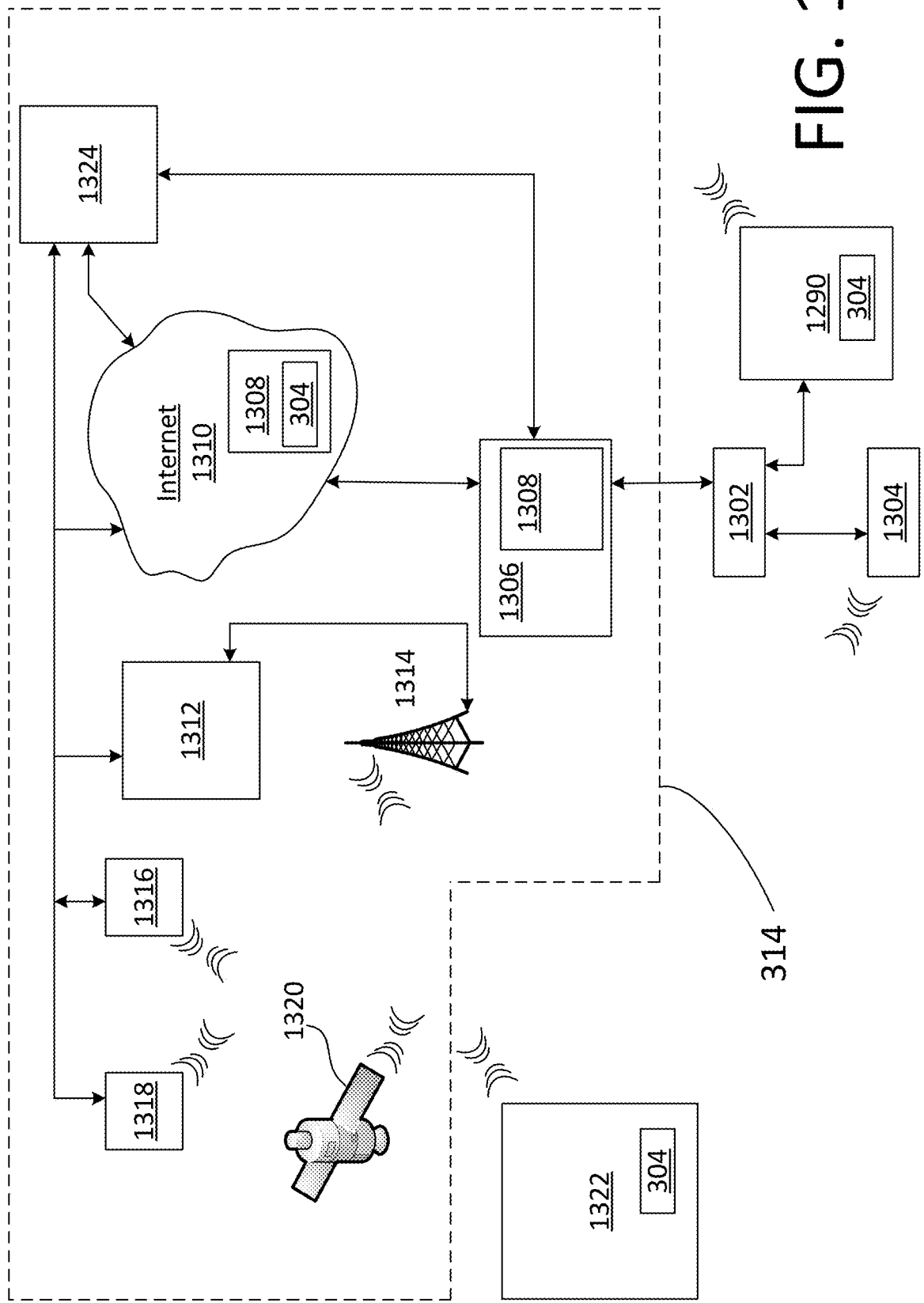
FIG. 13 illustrates a network system within which the system and method for dynamically adjusting delay in an audio system on a computer can be implemented according to aspects of the embodiments.

FIG. 13 illustrates network system 314 within which the system and method for dynamically adjusting delay in an audio system on a computer can be implemented according to aspects of the embodiments. Much of the infrastructure of network system 314 shown in FIG. 13 is or should be known to those of skill in the art, so, in fulfillment of the dual purposes of clarity and brevity, a detailed discussion thereof shall be omitted.

According to aspects of the embodiments, a user of the above described system and method can store DDA App 304 on their computer 1290 as well as mobile electronic device (MED)/personal electronic device (PED) 1322 (hereon in referred to as "PEDs 1322). PEDs 1322 can include, but are not limited to, so-called smart phones, tablets, personal digital assistants (PDAs), notebook and laptop computers, and essentially any device that can access the internet and/or cellular phone service or can facilitate transfer of the same type of data in either a wired or wireless manner.

PED 1322 can access cellular service provider 1312, either through a wireless connection (cellular tower 1314) or via a wireless/wired interconnection (a "Wi-Fi" system that comprises, e.g., modulator/demodulator (modem) 1302, wireless router yy04, internet service provider (ISP) 1306, and internet 1310 (although not shown, those of skill in the art can appreciate that internet 1310 comprises various different types of communications cables, servers/routers/ switches 1308, and the like, wherein data/software/applications of all types is stored in memory within or attached to servers or other processor based electronic devices, including, for example, DDA App 304 within a computer/server that can be accessed by a user of DDA App 304 on their PED 1322 and/or computer 1290). As those of skill in the art can further appreciate, internet 1310 can include access to "cloud" computing service(s) and devices, wherein the cloud refers to the on-demand availability of computer system resources, especially data storage and computing power, without direct active management by the user. Large clouds often have functions distributed over multiple locations, each location being a data center.

Further, PED 1322 can include NFC, "Wi-Fi," and Bluetooth (BT) communications capabilities as well, all of which are known to those of skill in the art. To that end, network system 1210 further includes, as many homes (and businesses) do, one or more computers 1290 that can be connected to wireless router 1304 via a wired connection (e.g., modem 1302) or via a wireless connection (e.g., Bluetooth). Modem 1302 can be connected to ISP 1306 to provide internet-based communications in the appropriate format to end users (e.g., computer 1290), and which takes signals from the end users and forwards them to ISP 1306.

PEDs 1322 can also access global positioning system (GPS) satellite 1320, which is controlled by GPS station 1318, to obtain positioning information (which can be useful for different aspects of the embodiments), or PEDs 1322 can obtain positioning information via cellular service provider 1312 using cellular tower(s) 1314 according to one or more methods of position determination. Some PEDs 1322 can also access communication satellites 1320 and their respective satellite communication systems control stations 1316 (the satellite in FIG. 13 is shown common to both communications and GPS functions) for near-universal communications capabilities, albeit at a much higher cost than convention "terrestrial" cellular services. PED 1322 can also obtain positioning information when near or internal to a building (or arena/stadium) through the use of one or more of NFC/BT devices. FIG. 13 also illustrates other components of network 314 such as plain old telephone service (POTS) provider 1324.

According to further aspects of the embodiments, and as described above, network 314 also contains other types of servers/devices that can include DDA App 304, wherein one or more processors, using currently available technology, such as memory, data and instruction buses, and other electronic devices, can store and implement code that can implement the system and methods 1000, 1100 among others, for dynamically adjusting delay in an audio system according to aspects of the embodiments.

According to further aspects of the embodiments, additional features and functions of inventive embodiments are described herein below, wherein such descriptions are to be viewed in light of the above noted detailed embodiments as understood by those skilled in the art.

As described above, an encoding process is discussed specifically in reference to FIGS. 10A, 10B, 11A, and 11B, although such delineation is not meant to be, and should not be taken in a limiting manner, as additional methods according to aspects of the embodiments have been described herein. The encoding processes as described are not meant to limit the aspects of the embodiments, or to suggest that the aspects of the embodiments should be implemented following the encoding processes. The purpose of the encoding processes as described is to facilitate the understanding of one or more aspects of the embodiments and to provide the reader with one or many possible implementations of the processed discussed herein. FIGS. 10A, 10B, 11A, and 11B illustrate flowcharts of various steps performed during the encoding process, but such encoding processes are not limited thereto. The steps of FIGS. 10A, 10B, 11A, and 11B are not intended to completely describe the encoding processes but only to illustrate some of the aspects discussed above.

This application may contain material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The disclosed embodiments provide systems, methods, and modes for tracking and compensating for multiple types of dynamic delay between endpoints in an AV communications system. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus, the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

Industrial Applicability

To solve the aforementioned problems, the aspects of the embodiments are directed towards systems, methods, and modes for tracking and compensating for multiple types of dynamic delay between endpoints in an AV communications system.

Alternate Embodiments

Alternate embodiments may be devised without departing from the spirit or the scope of the different aspects of the embodiments.

What is claimed is:

1. A method for dynamically adjusting delay in an audio distribution system, the audio distribution system comprising a plurality of audio data channels, and wherein each of the audio data channels comprises a plurality of audio processing devices, the method comprising:
   determining which audio processing devices are part of each of the plurality of audio data channels, wherein each of the plurality of audio data channels comprises a path from a digital audio receiving device to a back end audio playing device;
   determining a digital audio processing delay for each of the audio processing devices for each of the audio data channels;
   determining a delay per audio data channel for each of the plurality of the audio data channels, wherein the delay per audio data channel comprises a sum of the audio processing delays for all of the audio processing devices that are part of each of the plurality of respective audio data channels;
   determining a maximum audio processing delay, wherein the maximum audio processing delay comprises a maximum of the plurality of the determined delays prior to broadcasting the digital audio data signals as acoustic audio signals;
   determining a delay difference per audio data channel, wherein the delay difference per audio data channel comprises a difference between the maximum audio processing delay and a respective delay per audio data channel; and
   adding the delay difference per audio data channel to each digital audio word in the respective audio data channel such that the digital audio data processing delay between each of the different audio data channels is substantially equal.

2. The method according to claim 1, further comprising:
   comparing each of delay difference per audio data channel to a first predetermined threshold, and
      if any of the delay difference per audio data channel are the same or greater than the first predetermined threshold, then performing the step of adding the delay difference per audio data channel to each digital audio word, and
      if none of the delay difference per audio data channel exceed the first predetermined threshold, then not performing the step of adding the delay difference per audio data channel to each digital audio word.

3. The method according to claim 2, wherein
the first predetermined threshold comprises an amount of time that if met or exceeded creates audible audio synchronization issues.

4. The method according to claim 2, further comprising:
returning to the step of determining a maximum audio processing delay, and repeating the remaining steps if none of the delay difference per audio data channel exceed the first predetermined threshold.

5. The method according to claim 1, wherein each back end audio playing device comprises at least one loudspeaker and wherein the method further comprises:
   transmitting each digital audio word with the added delay difference per audio data channel to the different audio data channels;
   receiving the each digital audio word with the added delay difference per audio data channel at a respective back end audio playing device;
   extracting the added delay difference per audio data channel from the each received digital audio word;
   transmitting the added delay difference per audio data channel to a respective delay device;
   delaying the received digital audio word by an amount substantially equal to the added delay difference per audio data channel by the respective delay device; and
   broadcasting the delayed digital audio word by the at least one loudspeaker at each back end audio playing device as acoustic audio signals such that each acoustic audio signal is broadcast substantially simultaneously.

6. The method according to claim 1, wherein the step of determining a maximum audio processing delay further comprises:
   recording a configuration of each of the audio processing devices and revising a delay associated with each of the audio processing devices and for the respective audio data channel if the configuration changes.

7. An audio distribution system, comprising:
   a plurality of audio processing devices, each of the plurality of audio processing devices comprising at least one digital audio receiving device and a plurality of back end audio playing devices, the plurality of audio processing devices organized into audio data channels;
   a plurality of loudspeakers, at least one for each audio data channel;
   a plurality of digital audio delay devices, at least one for each audio data channel;
   at least one processor in each of the a least one digital audio receiving device and in each of the plurality of back end audio playing devices;
   a memory device operatively connected with each of the processors, wherein each of the memory devices stores computer-executable instructions that, when executed by each of the processors, causes each of the processors to execute a method that comprises:
      determining which audio processing devices are part of each of the plurality of audio data channels, wherein each of the plurality of audio data channels comprises a path from a digital audio receiving device to a back end audio playing device;
      determining a digital audio processing delay for each of the audio processing devices for each of the audio data channels;
      determining a delay per audio data channel for each of the plurality of the audio data channels, wherein the delay per audio data channel comprises a sum of the audio processing delays for all of the audio processing devices that are part of each of the plurality of respective audio data channels;
   determining a maximum audio processing delay, wherein the maximum audio processing delay comprises a maximum of the plurality of the determined delays prior to broadcasting the digital audio data signals as acoustic audio signals;
      determining a delay difference per audio data channel, wherein the delay difference per audio data channel comprises a difference between the maximum audio processing delay and a respective delay per audio data channel; and
      adding the delay difference per audio data channel to each digital audio word in the respective audio data channel such that the digital audio data processing delay between each of the different audio data channels is substantially equal.

8. The audio distribution system according to claim 7, wherein the method that is executed by the processors further comprises:

comparing each delay difference per audio data channel to a first predetermined threshold, and
if any of the delay difference per audio data channel are the same or greater than the first predetermined threshold, then performing the step of adding the delay difference per audio data channel to each digital audio word, and
if none of the delay difference per audio data channel exceed the first predetermined threshold, then not performing the step of adding the delay difference per audio data channel to each digital audio word.

9. The audio distribution system according to claim 8, wherein
the first predetermined threshold comprises an amount of time that if met or exceeded creates audible audio synchronization issues.

10. The audio distribution system according to claim 8, wherein the method that is executed by the processor further comprises:
returning to the step of determining a maximum audio processing delay, and repeating the remaining steps if none of the delay difference per audio data channel exceed the first predetermined threshold.

11. The audio distribution system according to claim 7, wherein the method that is executed by the processor wherein each back end audio playing device comprises at least one loudspeaker and wherein the method further comprises:

transmitting each digital audio word with the added delay difference per audio data channel to the different audio data channels;
receiving the each digital audio word with the added delay difference per audio data channel at a respective back end audio playing device;
extracting the added delay difference per audio data channel from the each received digital audio word;
transmitting the added delay difference per audio data channel to a respective delay device;
delaying the received digital audio word by an amount substantially equal to the added delay difference per audio data channel by the respective delay device; and
broadcasting the delayed digital audio word by respective loudspeakers at each back end device as acoustic audio signals such that each acoustic audio signal is broadcast substantially simultaneously.

12. The audio distribution system according to claim 7, wherein the step of determining which of the audio data channels has the greatest delay in processing and transmitting digital audio data signals further comprises:
recording a configuration of each of the audio processing devices and revising a delay associated with each of the audio processing devices and for the respective audio data channel if the configuration changes.

* * * * *